United States Patent
Wang et al.

(10) Patent No.: US 9,960,880 B2
(45) Date of Patent: May 1, 2018

(54) SIGNAL SENDING METHOD AND DEVICE

(71) Applicant: HUAWEI TECHNOLOGIES CO., LTD., Shenzhen, Guangdong (CN)

(72) Inventors: Huiming Wang, Xi'an (CN); Feng Liu, Xi'an (CN); Rong Wu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days. days.

(21) Appl. No.: 15/712,581

(22) Filed: Sep. 22, 2017

(65) Prior Publication Data

US 2018/0013515 A1    Jan. 11, 2018

Related U.S. Application Data

(63) Continuation of application No. PCT/CN2015/091761, filed on Oct. 12, 2015.

(30) Foreign Application Priority Data

Mar. 23, 2015 (CN) .......................... 2015 1 0127516

(51) Int. Cl.
*H04K 3/00* (2006.01)
*H04W 12/02* (2009.01)
(Continued)

(52) U.S. Cl.
CPC ........... *H04K 3/825* (2013.01); *H04B 7/0617* (2013.01); *H04K 3/28* (2013.01); *H04L 25/0202* (2013.01);
(Continued)

(58) Field of Classification Search
CPC ........... H04K 3/825; H04K 3/28; H04K 1/10; H04K 3/25; H04K 3/43; H04K 3/80;
(Continued)

(56) References Cited

U.S. PATENT DOCUMENTS 8,929,550 B2 *   1/2015   Shattil .................. H04W 12/08
                                                               380/270
2002/0098872 A1 *  7/2002  Judson ................ H04B 7/0623
                                                              455/562.1

FOREIGN PATENT DOCUMENTS

CN    102710310    10/2012
CN    102710363    10/2012
(Continued)

OTHER PUBLICATIONS

F. Wu, W. Wang, H. M. Wang and Q. Yin, "A unified mathematical model for spatial scrambling based secure wireless transmission and its wiretap method," 2011 International Conference on Wireless Communications and Signal Processing (WCSP), Nanjing, 2011, pp. 1-5.*

(Continued)

*Primary Examiner* — Matthew Eason
*Assistant Examiner* — Sabrina Diaz
(74) *Attorney, Agent, or Firm* — Staas & Halsey LLP

(57) ABSTRACT

The present disclosure discloses a signal sending method and device. The method includes: receiving, by a base station, an uplink pilot signal sent by authorized user equipment, and determining a direction vector parameter and a first channel fading parameter of a channel calculating, according to the direction vector parameter and the first channel fading parameter, a first signal beamformer parameter, determining a transmission area of an artificial noise signal according to the direction vector parameter, and calculating a second signal beamformer parameter; and processing a to-be-transmitted signal by using the first signal beamformer parameter and the second signal beamformer parameter, and transmitting the processed signal. In this way, in a non-target direction, energy leakage of the secrecy signal to the authorized user equipment is relatively small, (Continued)

and transmitted artificial noise signals are concentrated in an area with a relatively high secrecy signal leakage risk.

12 Claims, 7 Drawing Sheets

(51) Int. Cl.
    *H04L 25/02*     (2006.01)
    *H04B 7/06*     (2006.01)
    *H04L 25/03*     (2006.01)
    *H04L 29/06*     (2006.01)

(52) U.S. Cl.
    CPC ....... *H04W 12/02* (2013.01); *H04L 25/03343* (2013.01); *H04L 63/1475* (2013.01)

(58) Field of Classification Search
    CPC .............. H04B 7/0617; H04L 25/0202; H04L 25/03343; H04L 63/1475; H04W 12/02
    USPC ........................................................ 381/73.1
    See application file for complete search history.

(56) References Cited

FOREIGN PATENT DOCUMENTS

| | | |
|---|---|---|
| CN | 102724026 | 10/2012 |
| CN | 104320777 | 1/2015 |
| KR | 1020130102758 | 9/2013 |

OTHER PUBLICATIONS

International Search Report, dated Jan. 13, 2016, in international Application No. PCT/CN2015/091761 (4 pp.).
Wei-Cheng Liao et al. *QoS-Based Transmit Beamforming in the Presence of Eavesdroppers: An Optimized Artificial-Noise-Aided Approach*, IEEE Transactions on Signal Processing, vol. 59, No. 3, Mar. 2011, pp. 1202-1216.
Xi Zhang et al. *Artificial-Noise-Aided Secure Multi-Antenna Transmission in Slow Fading Channels With Limited Feedback*, 2014 IEEE International Conference on Acoustic, Speech and Signal Processing (ICASSP), pp. 3968-3972.
Wu FeiLong et al. *A unified mathematical model for spatial scrambling based secure wireless communication and its wiretap method*, Science China Press.vol. 42, No. 4. 2012, pp. 483-492.
Pin-Hsun Lin et al. *On Secrecy Rate of the Generalized Artificial-Noise Assisted Secure Beamforming for Wiretap Channels*, IEEE Journal on Selected Areas in Communications, vol. 31, No. 9, Sep. 2013, pp. 1728-1740.
Hui-Ming Wang et al. *Distributed Beamforming for Physical-Layer Security of Two-Way Relay Networks*, IEEE Transactions on Signal Processing, vol. 60, No. 7, Jul. 2012, pp. 3532-3545.
Zhao Jia-jie et al. *A Multi-user MIMO System Encryption Algorithm Based on Artificial Noise*, Journal of Electronics and Information Technology, vol. 34,No. 8, Aug. 2012 (5 pp.).
3GPP TR 36.897 V0.2.1 (Feb. 2015), *3rd Generation Partnership Project; Technical Specification Group Radio Access Network; Study on Elevation Beamforming/Full-Dimension (FD) MIMO for LTE (Release 13)*, pp. 1-25.
3GPP TS 25.224 V12.0.0 (Dec. 2013), *3rd Generation Partnership Project; Technical Specification Group Radio Access Network; Physical layer procedures (TDD) (Release 12)*, pp. 1-84.
3GPP TS 36.211 V12.4.0 (Dec. 2014), *3rd Generation Partnership Project; Technical pecification Group Radio Access Network; Evolved Universal Terrestrial Radio Access (E-UTRA); Physical channels and modulation (Release 12)*, pp. 1-124.
Written Opinion of the International Searching Authority, dated Jan. 13, 2016, in International Application No. PCT/CN2015/091761 (8 pp.).
Ng, Derrick Wing Kwan et al., *Robust Beamforming for Secure Communication in Systems With Wireless Information and Power Transfer*, IEEE Transactions on Wireless Communications, vol. 13, No. 8, Aug. 2014, XP11555849A, pp. 4599-4615.
Xi, Zhang et al., *Artificial-Noise-Aided Secure Multi-Antenna Transmission with Limited Feedback*, arxiv.org, Cornell University Library, Jan. 21, 2015, XP80676984A, pp. 1-13.
Extended European Search Report, dated Mar. 20, 2018, in European Application No. 15886067.6 (5 pp.).

\* cited by examiner

SIGNAL SENDING METHOD AND DEVICE

CROSS-REFERENCE TO RELATED APPLICATIONS

This application is a continuation of International Application No. PCT/CN2015/091761, filed on Oct. 12, 2015, which claims priority to Chinese Patent Application No. 201510127516.7, filed on Mar. 23, 2015. The disclosures of the aforementioned applications are hereby incorporated by reference in their entireties.

TECHNICAL FIELD

The present disclosure relates to the communications field, and specifically, to a signal sending method and device.

BACKGROUND

With development of a wireless communications network, due to openness of a wireless physical layer medium and electromagnetic signal transmission in a broadcast manner, data transmitted in the wireless communications network is more easily stolen by a third party than data transmitted in a wired network. Therefore, how to improve data transmission reliability and security in the wireless communications network is an urgent technical problem that needs to be resolved.

A conventional manner for ensuring the data transmission security in the wireless communications network may be: Data transmission security at a high layer (for example, a wireless link layer or an application layer) of a wireless communications network system is improved, for example, a cryptology theory—based data encryption method, or various security protocols. However, transmission security at a physical layer becomes a key that restricts security of the entire wireless communications network system, and how to ensure data transmission security at the physical layer becomes an important research topic.

An artificial noise (artificial noise) technology is a method that is applied to a multiple-antenna system and that is for improving the data transmission security at the physical layer. Specifically, a wanted signal is transmitted on a primary channel for data transmission, to ensure that an authorized receiver normally receives the wanted signal. In addition, an unwanted signal that is set artificially is transmitted in a direction orthogonal to the primary channel, to interfere with an unauthorized receiver in another direction as much as possible, and improve the data transmission security at the physical layer.

However, currently, artificial noise technology research mainly focuses on a single-cell scenario. When the artificial noise technology is applied to a multi-cell scenario of a cellular wireless communications network, a transmitted artificial noise not only interferes with an unauthorized receiver, but also causes interference to another authorized receiver with a same frequency as an authorized receiver. In this way, another user is affected, and performance of the cellular wireless communications network deteriorates.

SUMMARY

In view of this, embodiments of the present disclosure provide a signal sending method and device, to resolve a problem that in a current artificial noise technology, signal interference is caused to a signal received by another non-target authorized receiver.

According to a first aspect, a signal sending method is provided, including:

receiving, by a base station, an uplink pilot signal sent by authorized user equipment, and determining a direction vector parameter and a first channel fading parameter of a channel according to the uplink pilot signal, where the direction vector parameter is used for receiving a secrecy signal by the authorized user equipment, and the channel is used for transmitting the secrecy signal;

calculating, by the base station according to the direction vector parameter and the first channel fading parameter, a first signal beamformer parameter used for transmitting the secrecy signal, where the first signal beamformer parameter can enable energy leakage of the secrecy signal transmitted by the base station to be less than a first threshold, and enable a signal to interference plus noise ratio of the secrecy signal received by the authorized user equipment to be greater than a second threshold;

determining, by the base station, a transmission area of an artificial noise signal according to the direction vector parameter, and calculating, according to the direction vector parameter, a second signal beamformer parameter used for transmitting the artificial noise signal, where the second signal beamformer parameter can enable interference caused to the authorized user equipment by the artificial noise signal transmitted by the base station to be less than a preset threshold, enable a signal to interference plus noise ratio of the artificial noise signal received by unauthorized user equipment in the transmission area to be less than a third threshold, and enable a sum of transmit power of the artificial noise signal and transmit power of the secrecy signal to be less than preset transmit power; and processing, by the base station, a to-be-transmitted signal by using the first signal beamformer parameter and the second signal beamformer parameter, and transmitting the processed signal.

With reference to the first aspect, in a first possible implementation manner of the first aspect, the calculating, by the base station according to the direction vector parameter and the first channel fading parameter, a first signal beamformer parameter used for transmitting the secrecy signal includes:

when the energy leakage of the secrecy signal transmitted by using the first signal beamformer parameter is less than the first threshold, obtaining, by the base station, the following formula according to the direction vector parameter and the first channel fading parameter:

$\int_\Omega |\omega_1^H a(\theta)|^2 d\theta \leq \omega_1^H P \omega_1$;

when the secrecy signal transmitted by using the first signal beamformer parameter enables the signal to interference plus noise ratio of the secrecy signal received by the authorized user equipment to be greater than the specified second threshold, obtaining, by the base station, the following formula according to the direction vector parameter and the first channel fading parameter:

$|\alpha|^2 |\omega_1^H a(\theta_1)|^2 \geq \gamma_B$; and obtaining, by the base station according to $\int_{106} |\omega_1^H a(\theta)|^2 d\theta \leq \omega_1^H P \omega_1$ and $|\alpha|^2 |\omega_1^H a(\theta_1)|^2 \geq \gamma_B$, the first signal beamformer parameter used for transmitting the secrecy signal:

$$\omega_1 = \sqrt{\frac{\gamma_B}{|\alpha|^2}} \frac{P^{-1}a(\theta_1)}{a^H(\theta_1)P^{-1}a(\theta_1)};$$

where $\omega_1$ is the first signal beamformer parameter, $\omega_1^H$ is conjugate transpose of $\omega_1$, $a(\theta)$ is a direction vector function, $\theta$ is a direction angle whose value range is $\Omega$, $\Omega$ is a side lobe area of a secrecy signal beam, $a(\theta_1)$ is the direction vector parameter for receiving the secrecy signal by the authorized user equipment, $\theta_1$ is a direction angle for receiving the secrecy signal by the authorized user equipment, $\gamma_B$ is the second threshold, $\alpha$ is the first channel fading parameter of the channel used for transmitting the secrecy signal, $P = \int_{106} a(\theta)a^H(\theta)d\theta$, and $\omega_1^H P \omega_1$ is the first threshold.

With reference to the first aspect, in a second possible implementation manner of the first aspect, the calculating, by the base station according to the direction vector parameter, a second signal beamformer parameter used for transmitting the artificial noise signal includes:

when the interference caused to the authorized user equipment by the artificial noise signal transmitted by using the second signal beamformer parameter is less than the preset threshold, obtaining, by the base station, the following formula according to the direction vector parameter:

$\omega_0^H a(\theta_1) \leq \eta$;

when the signal to interference plus noise ratio of the artificial noise signal received by the unauthorized user equipment in the transmission area is less than the third threshold, obtaining, by the base station, the following formula according to the direction vector parameter:

$$\frac{|\omega_1^H a(\theta)|^2}{|\omega_0^H a(\theta)|^2} \leq \lambda;$$

when the sum of the transmit power of the artificial noise signal and the transmit power of the secrecy signal is less than the preset transmit power, obtaining, by the base station, the following formula:

$\omega_0^H \omega_0 \leq P_t - \omega_1^H \omega_1$; and obtaining, by the base station according to $$\omega_0^H a(\theta_1) \leq \eta, \frac{|\omega_1^H a(\theta)|^2}{|\omega_0^H a(\theta)|^2} \leq \lambda, \text{ and } \omega_0^H \omega_0 \leq P_t - \omega_1^H \omega_1,$$

the second signal beamformer parameter used for transmitting the artificial noise signal; where $\omega_0$ is the second signal beamformer parameter, $\omega_0^H$ is conjugate transpose of $\omega_0$, $a(\theta)$ is a direction vector function, $\theta$ is a direction angle whose value range is $\Omega_{AN}$, $\Omega_{AN}$ is the determined transmission area of the artificial noise signal, $a(\theta_1)$ is the direction vector parameter, $\lambda$ is the third threshold, $\eta$ is the preset threshold, $\omega_0^H \omega_0$ is the transmit power of the artificial noise signal, $\omega_1$ is the first signal beamformer parameter, $\omega_1^H$ is conjugate transpose of $\omega_1$, $\omega_1^H \omega_1$ is the transmit power of the secrecy signal, $P_t$ is the preset transmit power, and $\theta_1$ is a direction angle for receiving the secrecy signal by the authorized user equipment.

With reference to the first aspect, or the first possible implementation manner of the first aspect, or the second possible implementation manner of the first aspect, in a third possible implementation manner of the first aspect, the determining, by the base station, a transmission area of an artificial noise signal according to the direction vector parameter includes:

determining, by the base station, an energy leakage area of the secrecy signal according to the direction vector parameter in the following manner:

$$\frac{|\omega_1^H a(\theta_1)|^2}{|\omega_1^H a(\theta)|^2} \leq \gamma_{sl};$$

where $\omega_1$ is the first signal beamformer parameter, $\omega_1^H$ is the conjugate transpose of $\omega_1$, $a(\theta)$ is the direction vector function, $\theta$ is a direction angle whose value range is the energy leakage area, $a(\theta_1)$ is the direction vector parameter, $\theta_1$ is the direction angle for receiving the secrecy signal by the authorized user equipment, and $\gamma_{sl}$ is a specified value; and obtaining the transmission area of the artificial noise signal according to the energy leakage area of the secrecy signal and a main lobe area of a signal beamformer used for transmitting the secrecy signal.

With reference to the first aspect, or the first possible implementation manner of the first aspect, or the second possible implementation manner of the first aspect, or the third possible implementation manner of the first aspect, in a fourth possible implementation manner of the first aspect, the determining, by the base station, a transmission area of an artificial noise signal according to the direction vector parameter includes:

when there are at least two to-be-sent artificial noise signals, determining, by the base station, transmission areas of the at least two to-be-sent artificial noise signals according to the direction vector parameter;

dividing, by the base station, the determined transmission areas according to a quantity of to-be-sent artificial noise signals; and determining, by the base station, a transmission area for each to-be-sent artificial noise signal according to a division result, where transmission areas corresponding to all artificial noise signals do not overlap.

With reference to the first aspect, or the first possible implementation manner of the first aspect, or the second possible implementation manner of the first aspect, or the third possible implementation manner of the first aspect, or the fourth possible implementation manner of the first aspect, in a fifth possible implementation manner of the first aspect, the processing, by the base station, a to-be-transmitted signal by using the first signal beamformer parameter and the second signal beamformer parameter includes:

processing, by the base station, the to-be-transmitted signal by using the first signal beamformer parameter and the second signal beamformer parameter, to obtain the processed signal:

$y = \omega_1^H x + \omega_0^H n_a$; where y is the processed signal, $n_a$ is the artificial noise signal, $\omega_1$ is the first signal beamformer parameter, $\omega_1^H$ is the conjugate transpose of $\omega_1$, $\omega_0$ is the second signal beamformer parameter, and $\omega_0^H$ is the conjugate transpose of $\omega_0$.

According to a second aspect, a signal sending device is provided, including:

a receiving unit, configured to: receive an uplink pilot signal sent by authorized user equipment, and determine a direction vector parameter and a first channel fading parameter of a channel according to the uplink pilot signal, where the direction vector parameter is used for receiving a secrecy signal by the authorized user equipment, and the channel is used for transmitting the secrecy signal;

a calculation unit, configured to calculate, according to the direction vector parameter and the first channel fading parameter, a first signal beamformer parameter used for transmitting the secrecy signal, where the first signal beamformer parameter can enable energy leakage of the secrecy signal transmitted by the base station to be less than a first threshold, and enable a signal to interference plus noise ratio of the secrecy signal received by the authorized user equipment to be greater than a second threshold;

a determining unit, configured to determine a transmission area of an artificial noise signal according to the direction vector parameter; where the calculation unit is configured to calculate, according to the direction vector parameter, a second signal beamformer parameter used for transmitting the artificial noise signal, where the second signal beamformer parameter can enable interference caused to the authorized user equipment by the artificial noise signal transmitted by the base station to be less than a preset threshold, enable a signal to interference plus noise ratio of the artificial noise signal received by unauthorized user equipment in the transmission area to be less than a third threshold, and enable a sum of transmit power of the artificial noise signal and transmit power of the secrecy signal to be less than preset transmit power; and a sending unit, configured to: process a to-be-transmitted signal by using the first signal beamformer parameter and the second signal beamformer parameter, and transmit the processed signal.

With reference to the second aspect, in a first possible implementation manner of the second aspect, the calculation unit is specifically configured to: when the energy leakage of the secrecy signal transmitted by using the first signal beamformer parameter is less than the first threshold, obtain the following formula according to the direction vector parameter and the first channel fading parameter:

$\int_\Omega |\omega_1^H a(\theta)|^2 d\theta \leq \omega_1^H P \omega_1$;

when the secrecy signal transmitted by using the first signal beamformer parameter enables the signal to interference plus noise ratio of the secrecy signal received by the authorized user equipment to be greater than the specified second threshold, obtain the following formula according to the direction vector parameter and the first channel fading parameter:

$|\alpha|^2 |\omega_1^H a(\theta_1)|^2 \geq \gamma_B$; and obtain, according to $\int_\Omega |\omega_1^H a(\theta)|^2 d\theta \leq \omega_1^H P \omega_1$ and $|\alpha|^2 |\omega_1^H a(\theta_1)|^2 \geq \gamma_B$, the first signal beamformer parameter used for transmitting the secrecy signal:

$$\omega_1 = \sqrt{\frac{\gamma_B}{|\alpha|^2}} \frac{P^{-1} a(\theta_1)}{a^H(\theta_1) P^{-1} a(\theta_1)};$$

where $\omega_1$ is the first signal beamformer parameter, $\omega_1^H$ is conjugate transpose of $\omega_1$, $a(\theta)$ is a direction vector function, $\theta$ is a direction angle whose value range is $\Omega$, $\Omega$ is a side lobe area of a secrecy signal beam, $a(\theta_1)$ is the direction vector parameter for receiving the secrecy signal by the authorized user equipment, $\theta_1$ is a direction angle for receiving the secrecy signal by the authorized user equipment, $\gamma_B$ is the second threshold, $\alpha$ is the first channel fading parameter of the channel used for transmitting the secrecy signal, $P = \int_\Omega a(\theta) a^H(\theta) d\theta$, and $\omega_1^H P \omega_1$ is the first threshold.

With reference to the second aspect, in a second possible implementation manner of the second aspect, the calculation unit is specifically configured to: when the interference caused to the authorized user equipment by the artificial noise signal transmitted by using the second signal beamformer parameter is less than the preset threshold, obtain the following formula according to the direction vector parameter:

$\omega_0^H a(\theta_1) \leq \eta$;

when the signal to interference plus noise ratio of the artificial noise signal received by the unauthorized user equipment in the transmission area is less than the third threshold, obtain the following formula according to the direction vector parameter:

$$\frac{|\omega_1^H a(\theta)|^2}{|\omega_0^H a(\theta)|^2} \leq \lambda;$$

when the sum of the transmit power of the artificial noise signal and the transmit power of the secrecy signal is less than the preset transmit power, obtain the following formula:

$\omega_0^H \omega_0 \leq P_t - \omega_1^H \omega_1$; and obtain, according to $$\omega_0^H a(\theta_1) \leq \eta, \quad \frac{|\omega_1^H a(\theta)|^2}{|\omega_0^H a(\theta)|^2} \leq \lambda, \text{ and } \omega_0^H \omega_0 \leq P_t - \omega_1^H \omega_1,$$

the second signal beamformer parameter used for transmitting the artificial noise signal; where $\omega_0$ is the second signal beamformer parameter, $\omega_0^H$ is conjugate transpose of $\omega_0$, $a(\theta)$ is a direction vector function, $\theta$ is a direction angle whose value range is $\Omega_{AN}$, $\Omega_{AN}$ is the determined transmission area of the artificial noise signal, $a(\theta_1)$ is the direction vector parameter, $\lambda$ is the third threshold, $\eta$ is the preset threshold, $\omega_0^H \omega_0$ is the transmit power of the artificial noise signal, $\omega_1$ is the first signal beamformer parameter, $\omega_1^H$ is conjugate transpose of $\omega_1$, $\omega_1^H \omega_1$ is the transmit power of the secrecy signal, $P_t$ is the preset transmit power, and $\theta_1$ is a direction angle for receiving the secrecy signal by the authorized user equipment.

With reference to the second aspect, or the first possible implementation manner of the second aspect, or the second possible implementation manner of the second aspect, in a third possible implementation manner of the second aspect, the determining unit is specifically configured to determine an energy leakage area of the secrecy signal according to the direction vector parameter in the following manner:

$$\frac{|\omega_1^H a(\theta_1)|^2}{|\omega_0^H a(\theta)|^2} \leq \gamma_{st};$$

where $\omega_1$ is the first signal beamformer parameter, $\omega_1^H$ is the conjugate transpose of $\omega_1$, $a(\theta)$ is the direction vector function, θ is a direction angle whose value range is the energy leakage area, $a(\theta_1)$ is the direction vector parameter, $\theta_1$ is the direction angle for receiving the secrecy signal by the authorized user equipment, and $\gamma_{sl}$ is a specified value; and obtain the transmission area of the artificial noise signal according to the energy leakage area of the secrecy signal and a main lobe area of a signal beamformer used for transmitting the secrecy signal.

With reference to the second aspect, or the first possible implementation manner of the second aspect, or the second possible implementation manner of the second aspect, or the third possible implementation manner of the second aspect, in a fourth possible implementation manner of the second aspect, the determining unit is specifically configured to: when there are at least two to-be-sent artificial noise signals, determine transmission areas of the at least two to-be-sent artificial noise signals according to the direction vector parameter;

divide the determined transmission areas according to a quantity of to-be-sent artificial noise signals; and determine a transmission area for each to-be-sent artificial noise signal according to a division result, where transmission areas corresponding to all artificial noise signals do not overlap.

With reference to the second aspect, or the first possible implementation manner of the second aspect, or the second possible implementation manner of the second aspect, or the third possible implementation manner of the second aspect, or the fourth possible implementation manner of the second aspect, in a fifth possible implementation manner of the second aspect, the sending unit is specifically configured to process the to-be-transmitted signal by using the first signal beamformer parameter and the second signal beamformer parameter, to obtain the processed signal:

$$y = \omega_1^H x + \omega_0^H n_a; \text{ where}$$

y is the processed signal, $n_a$ is the artificial noise signal, $\omega_1$ is the first signal beamformer parameter, $\omega_1^H$ is the conjugate transpose of $\omega_1$, $\omega_0$ is the second signal beamformer parameter, and $\omega_0^H$ is the conjugate transpose of $\omega_0$.

According to a third aspect, a signal sending device is provided, including:

a signal receiver, configured to: receive an uplink pilot signal sent by authorized user equipment, and determine a direction vector parameter and a first channel fading parameter of a channel according to the uplink pilot signal, where the direction vector parameter is used for receiving a secrecy signal by the authorized user equipment, and the channel is used for transmitting the secrecy signal;

a processor, configured to: calculate, according to the direction vector parameter and the first channel fading parameter, a first signal beamformer parameter used for transmitting the secrecy signal, where the first signal beamformer parameter can enable energy leakage of the secrecy signal transmitted by the base station to be less than a first threshold, and enable a signal to interference plus noise ratio of the secrecy signal received by the authorized user equipment to be greater than a second threshold; and determine a transmission area of an artificial noise signal according to the direction vector parameter, and calculate, according to the direction vector parameter, a second signal beamformer parameter used for transmitting the artificial noise signal, where the second signal beamformer parameter can enable interference caused to the authorized user equipment by the artificial noise signal transmitted by the base station to be less than a preset threshold, enable a signal to interference plus noise ratio of the artificial noise signal received by unauthorized user equipment in the transmission area to be less than a third threshold, and enable a sum of transmit power of the artificial noise signal and transmit power of the secrecy signal to be less than preset transmit power; and a signal transmitter, configured to: process a to-be-transmitted signal by using the first signal beamformer parameter and the second signal beamformer parameter, and transmit the processed signal.

With reference to the third aspect, in a first possible implementation manner of the third aspect, that the processor calculates, according to the direction vector parameter and the first channel fading parameter, a first signal beamformer parameter used for transmitting the secrecy signal specifically includes:

when the energy leakage of the secrecy signal transmitted by using the first signal beamformer parameter is less than the first threshold, obtaining the following formula according to the direction vector parameter and the first channel fading parameter:

$$\int_\Omega |\omega_1^H a(\theta)|^2 d\theta \leq \omega_1^H P \omega_1;$$

when the secrecy signal transmitted by using the first signal beamformer parameter enables the signal to interference plus noise ratio of the secrecy signal received by the authorized user equipment to be greater than the specified second threshold, obtaining the following formula according to the direction vector parameter and the first channel fading parameter:

$$|\alpha|^2 |\omega_1^H a(\theta_1)|^2 \geq \gamma_B; \text{ and}$$

obtaining, according to $\int_\Omega |\omega_1^H a(\theta)|^2 d\theta \leq \omega_1^H P \omega_1$ and $|\alpha|^2 \omega_1^H a(\theta_1)|^2 \geq \gamma_B$, the first signal beamformer parameter used for transmitting the secrecy signal:

$$\omega_1 = \sqrt{\frac{\gamma_B}{|\alpha|^2}} \frac{P^{-1} a(\theta_1)}{a^H(\theta_1) P^{-1} a(\theta_1)};$$

where $\omega_1$ is the first signal beamformer parameter, $\omega_1^H$ is conjugate transpose of $\omega_1$, $a(\theta)$ is a direction vector function, θ is a direction angle whose value range is Ω, Ω is a side lobe area of a secrecy signal beam, $a(\theta_1)$ is the direction vector parameter for receiving the secrecy signal by the authorized user equipment, $\theta_1$ is a direction angle for receiving the secrecy signal by the authorized user equipment, $\gamma_B$ is the second threshold, α is the first channel fading parameter of the channel used for transmitting the secrecy signal, $P = \int_\Omega a(\theta) a^H(\theta) d\theta$, and $\omega_1^H P \omega_1$ is the first threshold.

With reference to the third aspect, in a second possible implementation manner of the third aspect, that the processor calculates, according to the direction vector parameter, a second signal beamformer parameter used for transmitting the artificial noise signal specifically includes:

when the interference caused to the authorized user equipment by the artificial noise signal transmitted by using the second signal beamformer parameter is less than the preset threshold, obtaining the following formula according to the direction vector parameter:

$$\omega_0^H a(\theta_1) \leq \eta;$$

when the signal to interference plus noise ratio of the artificial noise signal received by the unauthorized user equipment in the transmission area is less than the third threshold, obtaining the following formula according to the direction vector parameter:

$$\frac{|\omega_1^H a(\theta)|^2}{|\omega_0^H a(\theta)|^2} \leq \lambda;$$

when the sum of the transmit power of the artificial noise signal and the transmit power of the secrecy signal is less than the preset transmit power, obtaining the following formula:

$$\omega_0^H \omega_0 \leq P_t - \omega_1^H \omega_1; \text{ and}$$

obtaining, according to $$\omega_0^H a(\theta_1) \leq \eta, \frac{|\omega_1^H a(\theta)|^2}{|\omega_0^H a(\theta)|^2} \leq \lambda, \text{ and } \omega_0^H \omega_0 \leq P_t - \omega_1^H \omega_1,$$

the second signal beamformer parameter used for transmitting the artificial noise signal; where $\omega_0$ is the second signal beamformer parameter, $\omega_0^H$ is conjugate transpose of $\omega_0$, $a(\theta)$ is a direction vector function, $\theta$ is a direction angle whose value range is $\Omega_{AN}$, $\Omega_{AN}$ is the determined transmission area of the artificial noise signal, $a(\theta_1)$ is the direction vector parameter, $\lambda$ is the third threshold, $\eta$ is the preset threshold, $\omega_0^H \omega_0$ is the transmit power of the artificial noise signal, $\omega_1$ is the first signal beamformer parameter, $\omega_1^H$ is conjugate transpose of $\omega_1$, $\omega_1^H \omega_1$ is the transmit power of the secrecy signal, $P_t$ is the preset transmit power, and $\theta_1$ is a direction angle for receiving the secrecy signal by the authorized user equipment.

With reference to the third aspect, or the first possible implementation manner of the third aspect, or the second possible implementation manner of the third aspect, in a third possible implementation manner of the third aspect, that the processor determines a transmission area of an artificial noise signal according to the direction vector parameter specifically includes:

determining an energy leakage area of the secrecy signal according to the direction vector parameter in the following manner:

$$\frac{|\omega_1^H a(\theta_1)|^2}{|\omega_1^H a(\theta)|^2} \leq \gamma_{sl};$$

where $\omega_1$ is the first signal beamformer parameter, is the conjugate transpose of $\omega_1$, $a(\theta)$ is the direction vector function, $\theta$ is a direction angle whose value range is the energy leakage area, $a(\theta_1)$ is the direction vector parameter, $\theta_1$ is the direction angle for receiving the secrecy signal by the authorized user equipment, and $\gamma_{sl}$ is a specified value; and obtaining the transmission area of the artificial noise signal according to the energy leakage area of the secrecy signal and a main lobe area of a signal beamformer used for transmitting the secrecy signal.

With reference to the third aspect, or the first possible implementation manner of the third aspect, or the second possible implementation manner of the third aspect, or the third possible implementation manner of the third aspect, in a fourth possible implementation manner of the third aspect, that the processor determines a transmission area of an artificial noise signal according to the direction vector parameter includes:

when there are at least two to-be-sent artificial noise signals, determining transmission areas of the at least two to-be-sent artificial noise signals according to the direction vector parameter;

dividing the determined transmission areas according to a quantity of to-be-sent artificial noise signals; and determining a transmission area for each to-be-sent artificial noise signal according to a division result, where transmission areas corresponding to all artificial noise signals do not overlap.

With reference to the third aspect, or the first possible implementation manner of the third aspect, or the second possible implementation manner of the third aspect, or the third possible implementation manner of the third aspect, or the fourth possible implementation manner of the third aspect, in a fifth possible implementation manner of the third aspect, that the signal transmitter processes a to-be-transmitted signal by using the first signal beamformer parameter and the second signal beamformer parameter includes:

processing the to-be-transmitted signal by using the first signal beamformer parameter and the second signal beamformer parameter, to obtain the processed signal:

$$y = \omega_1^H x + \omega_0^H n_a; \text{ where}$$

y is the processed signal, $n_a$ is the artificial noise signal, $\omega_1$ is the first signal beamformer parameter, $\omega_1^H$ is the conjugate transpose of $\omega_1$, $\omega_0$ is the second signal beamformer parameter, and $\omega_0^H$ is the conjugate transpose of $\omega_0$.

Beneficial effects of the present disclosure are as follows:

In the embodiments of the present disclosure, a base station receives an uplink pilot signal sent by authorized user equipment, and determines a direction vector parameter and a first channel fading parameter of a channel according to the uplink pilot signal, where the direction vector parameter is used for receiving a secrecy signal by the authorized user equipment, and the channel is used for transmitting the secrecy signal; calculates, according to the direction vector parameter and the first channel fading parameter, a first signal beamformer parameter used for transmitting the secrecy signal, determines a transmission area of an artificial noise signal according to the direction vector parameter, and calculates, according to the direction vector parameter, a second signal beamformer parameter used for transmitting the artificial noise signal; and processes a to-be-transmitted signal by using the first signal beamformer parameter and the second signal beamformer parameter, and transmits the processed signal. In this way, in a non-target direction, energy leakage of the secrecy signal transmitted by the base station to the authorized user equipment is relatively small, and the base station transmits an artificial noise signal to unauthorized user equipment in a determined transmission area of the artificial noise signal. Therefore, artificial noise signals are concentrated in an area with a relatively high secrecy signal leakage risk, to reduce interference caused to signal receiving of authorized user equipment in another direction.

BRIEF DESCRIPTION OF DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and persons of ordinary skill in the art may still derive other drawings from these accompanying drawings without creative efforts.

DESCRIPTION OF EMBODIMENTS

To achieve the objective of the present disclosure, embodiments of the present disclosure provide a signal sending method and device. A base station receives an uplink pilot signal sent by authorized user equipment, and determines a direction vector parameter and a first channel fading parameter of a channel according to the uplink pilot signal. The direction vector parameter is used for receiving a secrecy signal by the authorized user equipment, and the channel is used for transmitting the secrecy signal. The base station calculates, according to the direction vector parameter and the first channel fading parameter, a first signal beam former parameter used for transmitting the secrecy signal, determines a transmission area of an artificial noise signal according to the direction vector parameter, and calculates, according to the direction vector parameter, a second signal beamformer parameter used for transmitting the artificial noise signal, and the base station processes a to-be-transmitted signal by using the first signal beamformer parameter and the second signal beamformer parameter, and transmits the processed signal. In this way, in a non-target direction, energy leakage of the secrecy signal transmitted by the base station to the authorized user equipment is relatively small, and the base station transmits an artificial noise signal to unauthorized user equipment in a determined transmission area of the artificial noise signal. Therefore, artificial noise signals are concentrated in an area with a relatively high secrecy signal leakage risk, to reduce interference caused to signal receiving of authorized user equipment in another direction.

The following further describes the embodiments of the present disclosure in detail with reference to the accompanying drawings of the specification.

Figure 1:
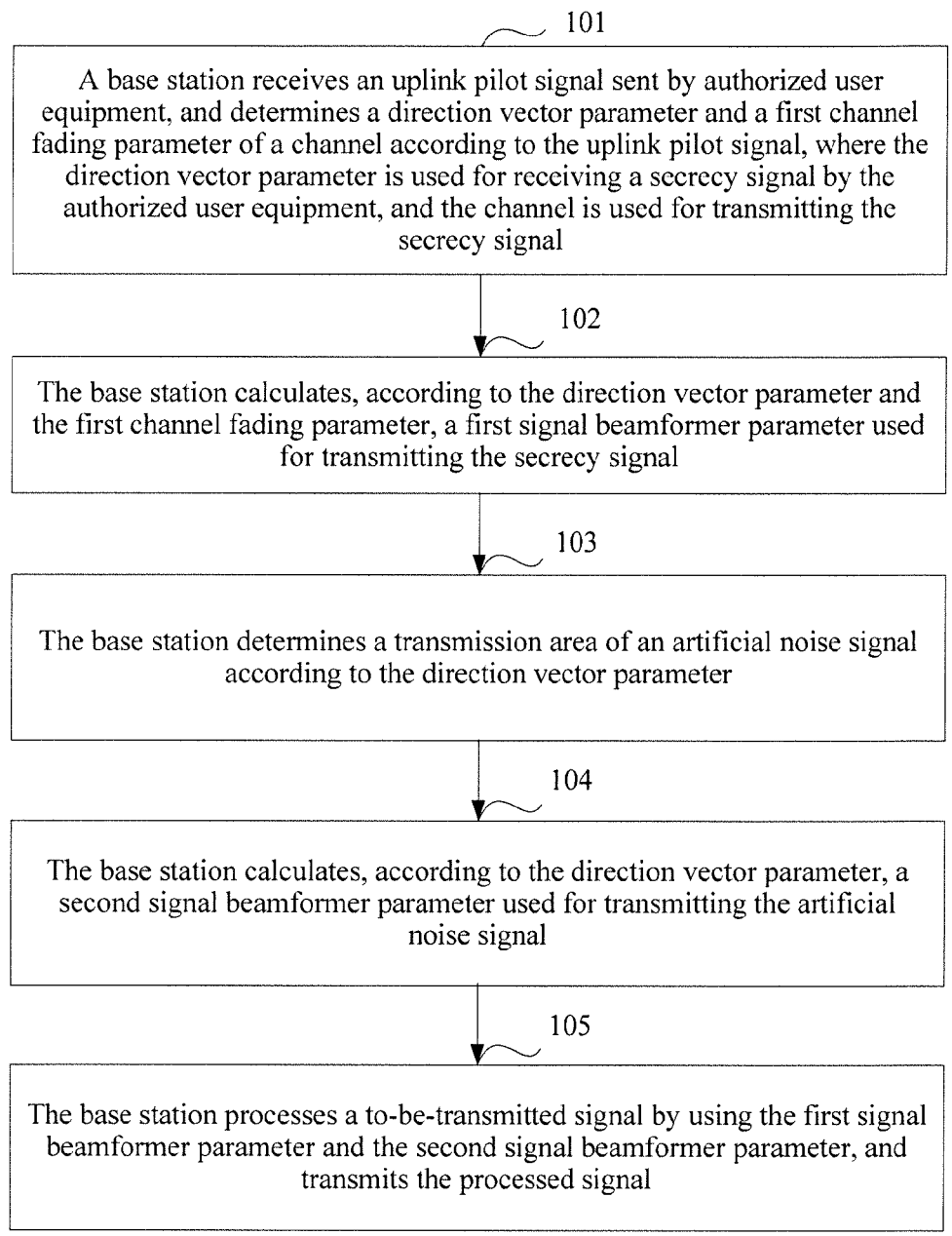
FIG. 1 is a schematic flowchart of a signal sending method according to an embodiment of the present disclosure.

FIG. 1 is a schematic flowchart of a signal sending method according to an embodiment of the present disclosure. The method may be described as follows:

Step 101: A base station receives an uplink pilot signal sent by authorized user equipment, and determines a direction vector parameter and a first channel fading parameter of a channel according to the uplink pilot signal, where the direction vector parameter is used for receiving a secrecy signal by the authorized user equipment, and the channel is used for transmitting the secrecy signal.

In step 101, the base station obtains, by means of estimation, the direction vector parameter and the first channel fading parameter of the channel by receiving the uplink pilot signal sent by the authorized user equipment. The direction vector parameter is used for receiving the secrecy signal by the authorized user equipment, and the channel is used for transmitting the secrecy signal.

It should be noted herein that only authorized user equipment sends an uplink pilot signal.

Step 102: The base station calculates, according to the direction vector parameter and the first channel fading parameter, a first signal beamformer parameter used for transmitting the secrecy signal.

The first signal beamformer parameter can enable energy leakage of the secrecy signal transmitted by the base station to be less than a first threshold, and enable a signal to interference plus noise ratio of the secrecy signal received by the authorized user equipment to be greater than a second threshold.

It should be noted that setting of the first threshold herein is associated with signal transmit power. The first threshold may be a minimum energy leakage value. In this embodiment of the present disclosure, a value or a form of the first threshold and a value or a form of the second threshold are not limited.

In step 102, to ensure that energy leakage of the secrecy signal in a non-target direction is less than the first threshold, and the signal to interference plus noise ratio of the secrecy signal received by the authorized user equipment is greater than the second threshold, the first signal beamformer parameter used for transmitting the secrecy signal is obtained by means of calculation according to the direction vector parameter and the first channel fading parameter by using a method of minimizing side lobe power of a signal beamformer.

Specifically, when the energy leakage of the secrecy signal transmitted by using the first signal beamformer parameter is less than the first threshold, the base station obtains the following formula according to the direction vector parameter and the first channel fading parameter:

$\int_\Omega |\omega_1^H a(\theta)|^2 d\theta \leq \omega_1^H P \omega_1$.

The first threshold may be $\omega_1^H P \omega_1$.

Optionally, that the energy leakage of the secrecy signal transmitted by using the first signal beamformer parameter is less than the first threshold may be converted into the following formula:

$$\min_{\omega_1} \int_\Omega |\omega_1^H a(\theta)|^2 d\theta = \omega_1^H P \omega_1.$$

That is, a minimum energy leakage value of the secrecy signal transmitted by using the first signal beamformer parameter is equal to the first threshold.

When the secrecy signal transmitted by using the first signal beamformer parameter enables the signal to interference plus noise ratio of the secrecy signal received by the authorized user equipment to be greater than the specified second threshold, the base station obtains the following formula according to the direction vector parameter and the first channel fading parameter:

$|\alpha|^2 |\omega_1^H a(\theta_1)|^2 \leq \gamma_B$.

The base station obtains, according to $|\alpha|^2 |\omega_1^H a(\theta_1)|^2 \leq \gamma_B$ and $\int_\Omega \omega_1^H a(\theta) 51\ ^2 d\theta \geq \omega_1^H P \omega_1$, the first signal beamformer parameter used for transmitting the secrecy signal:

$$\omega_1 = \sqrt{\frac{\gamma_B}{|\alpha|^2}} \frac{P^{-1}a(\theta_1)}{a^H(\theta_1)P^{-1}a(\theta_1)},$$

where $\omega_1$ is the first signal beamformer parameter, $\omega_1^H$ is conjugate transpose of $\omega_1$, $a(\theta)$ is a direction vector function, $\theta$ is a direction angle whose value range is $\Omega$, $\Omega$ is a side lobe area of a secrecy signal beam, $a(\theta_1)$ is the direction vector parameter for receiving the secrecy signal by the authorized user equipment, $\theta_1$ is a direction angle for receiving the secrecy signal by the authorized user equipment, $\gamma_B$ is the second threshold, $\alpha$ is the first channel fading parameter of the channel used for transmitting the secrecy signal, $P = \int_\Omega a(\theta)a^H(\theta)d\theta$, and $\omega_1^H P\omega_1$ is the first threshold.

Specifically, when $|\alpha|^2 \omega_1^H a(\theta_1)|^2$ is equal to $\gamma_B$, an optimal solution $\omega_1^0$ is obtained.

In addition, for $\omega_1^0$ multiplied by $$e^{j\theta}, \min_{\omega_1} \int_\Omega |\omega_1^H a(\theta)|^2 d\theta = \omega_1^H P \omega_1$$

is equivalent to $$\min_{\omega_1} \omega_1^H P\omega_1, \text{ and } |\alpha|^2 |\omega_1^H a(\theta_1)|^2 \geq \gamma_B$$

is equivalent to $$\omega_1^H a(\theta_1) = \sqrt{\frac{\gamma_B}{|\alpha|^2}}.$$

A corresponding Lagrangian function that is obtained by means of transformation is:

$$L(\omega_1, \lambda) = \omega_1^H P\omega_1 + \lambda\left(\omega_1^H a(\theta_1) - \sqrt{\frac{\gamma_B}{|\alpha|^2}}\right).$$

$$\frac{\partial L(\omega_1, \lambda)}{\partial \omega_1^*} = P\omega_1 + \lambda a(\theta_1) = 0 \text{ and}$$

$$\frac{\partial L(\omega_1, \lambda)}{\partial \lambda} = \omega_1^H a(\theta_1) - \sqrt{\frac{\gamma_B}{|\alpha|^2}} = 0$$

may be obtained when KKT (Karush-Kuhn-Tucker) conditions are used for solving.

The following may be obtained according to the foregoing two formulas:

$$\omega_1 = \sqrt{\frac{\gamma_B}{|\alpha|^2}} \frac{P^{-1}a(\theta_1)}{a^H(\theta_1)P^{-1}a(\theta_1)}.$$

Optionally, the base station may further obtain, by means of calculation according to the direction vector parameter and the first channel fading parameter in the following manner, the first signal beamformer parameter used for transmitting the secrecy signal.

That is, a design rule of minimizing maximum secrecy signal leakage power is used, that is, $$\min_{\omega_1} \max_{\theta \in \Omega} |\omega_1^H a(\theta)|^2 \text{ and } \omega_1^H a(\theta_1) = 1$$

are obtained, where $\omega_1$ is the first signal beamformer parameter, $\omega_1^H$ is conjugate transpose of $\omega_1$, $a(\theta)$ is a direction vector function, $\theta$ is a direction angle whose value range is $\Omega$, $\Omega$ is a side lobe area of a secrecy signal beam, $a(\theta_1)$ is the direction vector parameter, and $\theta_1$ is a direction angle for receiving the secrecy signal by the authorized user equipment.

The obtained $$\min_{\omega_1} \max_{\theta \in \Omega} |\omega_1^H a(\theta)|^2 \text{ and } \omega_1^H a(\theta_1) = 1$$

are transformed by introducing a slack variable t, to obtain $\omega_1^H a(\theta_1)=1$ and $|\omega_1^H a(\theta)|^2 \leq t$, $\theta \in \Omega$. $\omega_1$ may be obtained by means of solution.

Optionally, when there are multiple authorized user equipments that receive secrecy signals, each authorized user equipment receives a secrecy signal. For each to-be-sent secrecy signal, a first signal beamformer parameter for sending the secrecy signal may be determined in the foregoing manner, so that each secrecy signal sent by using the first signal beamformer parameter can have minimal secrecy signal energy leakage, and a signal to interference plus noise ratio of the secrecy signal received by the authorized user equipment is greater than the second threshold.

For example, a first signal beamformer parameter corresponding to the $i^{th}$ secrecy signal may be obtained by means of calculation by using the following expression:

$$\begin{cases} \min_{\omega_i} \int_{\Omega_i} |\omega_i^H a(\theta)|^2 d\theta = \omega_i^H P\omega_i \\ |\alpha_i|^2 |\omega_i^H a(\theta_i)|^2 \geq \gamma_{B,i} \\ \omega_i^H a(\theta_j) = 0, j = 1, 2, \ldots, M, j \neq i \end{cases},$$

where M is a quantity of secrecy signals.

When an equal sign is taken for $|\alpha_i|^2 \omega_1^H a(\theta_i)|^2 \geq \gamma_{B,i}$, the first signal beamformer parameter $\omega_i$ corresponding to the $i^{th}$ secrecy signal is obtained by means of calculation.

Step 103: The base station determines a transmission area of an artificial noise signal according to the direction vector parameter.

In step 103, to interfere with potential illegitimate user equipment and reduce, as much as possible, interference caused to other authorized user equipment by the artificial noise signal, the transmission area of the artificial noise signal needs to be determined.

That is, the transmission area of the artificial noise signal needs to be an area with relatively high signal strength in a side lobe area of a beamformer of the secrecy signal.

Specifically, the base station determines an energy leakage area of the secrecy signal according to the direction vector parameter in the following manner:

$$\frac{|\omega_1^H a(\theta_1)|^2}{|\omega_1^H a(\theta)|^2} \le \gamma_{sl};$$

where $\omega_1$ is the first signal beamformer parameter, $\omega_1^H$ is the conjugate transpose of $\omega_1$, $a(\theta)$ is the direction vector function, $\theta$ is a direction angle whose value range is the energy leakage area, $a(\theta_1)$ is the direction vector parameter, $\theta_1$ is the direction angle for receiving the secrecy signal by the authorized user equipment, and $\gamma_{sl}$ is a specified value; and obtains the transmission area of the artificial noise signal according to the determined energy leakage area of the secrecy signal and a main lobe area of a signal beamformer used for transmitting the secrecy signal.

Optionally, that the base station determines a transmission area of an artificial noise signal according to the direction vector parameter includes:

when there are at least two to-be-sent artificial noise signals, the base station determines transmission areas of the at least two to-be-sent artificial noise signals according to the direction vector parameter;

the base station divides the determined transmission areas according to a quantity of transmitted artificial noise signals; and the base station determines a transmission area for each artificial noise signal according to a division result, where transmission areas corresponding to all artificial noise signals do not overlap.

It should be noted that the determined transmission areas may be equally divided, or may be divided according to a requirement. This is not limited herein.

Step 104: The base station calculates, according to the direction vector parameter, a second signal beamformer parameter used for transmitting the artificial noise signal.

The second signal beamformer parameter can enable interference caused to the authorized user equipment by the artificial noise signal transmitted by the base station to be less than a preset threshold, enable a signal to interference plus noise ratio of the artificial noise signal received by unauthorized user equipment in the transmission area to be less than a third threshold, and enable a sum of transmit power of the artificial noise signal and transmit power of the secrecy signal to be less than preset transmit power.

In step 104, when the interference caused to the authorized user equipment by the artificial noise signal transmitted by using the second signal beamformer parameter is less than the preset threshold, the base station obtains the following formula according to the direction vector parameter:

$$\omega_0^H a(\theta_1) \le \eta.$$

It should be noted that a preferred value of $\eta$ is 0.

When the base station determines that the signal to interference plus noise ratio of the artificial noise signal received by the unauthorized user equipment in the transmission area is less than the specified third threshold, the base station obtains the following formula according to the direction vector parameter:

$$\frac{|\omega_1^H a(\theta)|^2}{|\omega_0^H a(\theta)|^2} \le \lambda.$$

When the sum of the transmit power of the artificial noise signal and the transmit power of the secrecy signal is less than the preset transmit power, the base station obtains the following formula:

$$\omega_0^H \omega_0 \le P_t - \omega_1^H \omega_1.$$

The base station obtains, according to $$\omega_0^H a(\theta_1) \le \eta, \frac{|\omega_1^H a(\theta)|^2}{|\omega_0^H a(\theta)|^2} \le \lambda, \text{ and } \omega_0^H \omega_0 \le P_t - \omega_1^H \omega_1,$$

the second signal beamformer parameter used for transmitting the artificial noise signal, where $\omega_0$ is the second signal beamformer parameter, $\omega_0^H$ is conjugate transpose of $\omega_0$, $a(\theta)$ is a direction vector function, $\theta$ is a direction angle whose value range is $\Omega_{AN}$, $\Omega_{AN}$ is the determined transmission area of the artificial noise signal, $a(\theta_1)$ is the direction vector parameter, $\lambda$ is the third threshold, $\eta$ is the preset threshold, $\omega_0^H \omega_0$ is the transmit power of the artificial noise signal, $\omega_1$ is the first signal beamformer parameter, $\omega_1^H$ conjugate transpose of $\omega_1$, $\omega_1^H \omega_1$ is the transmit power of the secrecy signal, $P_t$ is the preset transmit power, and $\theta_1$ is a direction angle for receiving the secrecy signal by the authorized user equipment.

Specifically, because power of the artificial noise signal received by the unauthorized user equipment is far greater than that of an Additive Gaussian noise, the signal to interference plus noise ratio of the artificial noise signal received by the unauthorized user equipment in the transmission area may be represented as $$\frac{|\beta|^2 |\omega_1^H a(\theta)|^2}{1 + |\beta|^2 |\omega_0^H a(\theta)|^2}.$$

Approximate calculation is performed on the obtained signal to interference plus noise ratio of the artificial noise signal, to obtain $$\frac{|\beta|^2 |\omega_1^H a(\theta)|^2}{1 + |\beta|^2 |\omega_0^H a(\theta)|^2} \approx \frac{|\beta|^2 |\omega_1^H a(\theta)|^2}{|\beta|^2 |\omega_0^H a(\theta)|^2} = \frac{|\omega_1^H a(\theta)|^2}{|\omega_0^H a(\theta)|^2}.$$

According to $$\omega_0^H a(\theta_1) \le \eta, \frac{|\omega_1^H a(\theta)|^2}{|\omega_0^H a(\theta)|^2} \le \lambda, \text{ and } \omega_0^H \omega_0 \le P_t - \omega_1^H \omega_1,$$

the second signal beamformer parameter of the artificial noise signal may be optimized as:

$$\min_{\omega_0} \max_{\theta \in \Omega_{AN}} \frac{|\omega_1^H a(\theta)|^2}{|\omega_0^H a(\theta)|^2}, \omega_0^H a(\theta_1) = 0, \text{ and } \omega_0^H \omega_0 \le P_t - \omega_1^H \omega_1.$$

The following is obtained by introducing a slack variable m:

$$\begin{cases} \min_{\omega_0, m} m \\ \omega_0^H a(\theta_1) = 0 \\ \omega_0^H \omega_0 \leq P_t - \omega_1^H \omega_1 \\ \dfrac{|\omega_1^H a(\theta)|^2}{|\omega_0^H a(\theta)|^2} \leq m \end{cases} ; \text{where } \theta \in \Omega_{AN}.$$

The following is obtained by performing sampling calculation in $\Omega_{AN}$:

$$\begin{cases} \min_{\omega_0, m} m \\ \omega_0^H a(\theta_1) = 0 \\ \omega_0^H \omega_0 \leq P_t - \omega_1^H \omega_1 \\ \dfrac{|\omega_1^H a(\theta_i)|^2}{|\omega_0^H a(\theta_i)|^2} \leq m, \theta_i \in \Omega_{AN}, i = 1, 2, \ldots, L \end{cases}, \text{where } \theta_i$$

is an angle obtained by means of sampling, and L is a quantity of sampling points.

Because $$\dfrac{|\omega_1^H a(\theta_i)|^2}{|\omega_0^H a(\theta_i)|^2} \leq m$$

in the foregoing expression is not convex, a continuous convex approximation method is used to perform iteration and solving.

Because functions that need to be approximated are all convex functions, a convex approximation function of $$\dfrac{|\omega_1^H a(\theta_i)|^2}{|\omega_0^H a(\theta_i)|^2} \leq m$$

may be obtained by using a first-order condition $f(y) \geq f(x) + (\nabla f(x))^T (y-x)$ of a convex function:

$$2\text{Re}[\omega_{0,l-1}{}^H a(\theta_i) a^H(\theta_i) \omega_0] - |\omega_{0,l-1}{}^H a(\theta_i)|^2 \leq |\omega_0^H a(\theta_i)|^2.$$

Further, the following is obtained:

$$\begin{cases} \min_{\omega_0, m} m \\ \omega_0^H a(\theta_1) = 0 \\ \omega_0^H \omega_0 \leq P_t - \omega_1^H \omega_1 \\ \dfrac{1}{m} |\omega_1^H a(\theta_i)|^2 \leq 2\,\text{Re}\,[\omega_{0,l-1}^H a(\theta_i) a^H(\theta_i) \omega_0] - |\omega_{0,l-1}^H a(\theta_i)|^2 \\ \theta_i \in \Omega_{AN}, i = 1, 2, \ldots, L \end{cases},$$

where $\omega_{0,l-1}$ is an optimal solution obtained after iteration for the $(l-1)^{th}$ time.

Optionally, any point $\omega_{0,0}$ is selected as an initial point, and $\omega_{0,0}$ may be obtained by means of calculation according to $$\omega_0^H a(\theta_1) = 0$$

$$\omega_0^H \omega_0 = P_t - \omega_1^H \omega_1.$$

Further, in the $(l+1)^{th}$ time of iteration, an optimal solution $\omega_{0,l}$ obtained after iteration for the $l^{th}$ time is used to replace $\omega_{0,l-1}$. The foregoing calculation is not repeated until a result is converged or a maximum allowed quantity of iteration times is reached, to obtain the required $\omega_0$.

Optionally, when there are at least two to-be-sent artificial noise signals, after the transmission area of each artificial noise signal is determined, a second signal beamformer parameter of each artificial noise signal is obtained by means of calculation in the foregoing manner.

Specifically, an obtained expression used to calculate a second signal beamformer parameter of the $i^{th}$ artificial noise signal is:

$$\begin{cases} \min_{\omega_{0,i}} \max_{\theta \in \Omega_{AN,i}} \dfrac{|\omega_1^H a(\theta)|^2}{|\omega_{0,i}^H a(\theta)|^2} \\ \omega_{0,i}^H a(\theta_i) = 0 \\ \omega_{0,i}^H \omega_{0,i} \leq \dfrac{P_t - \omega_1^H \omega_1}{M} \\ |\omega_{0,i}^H a(\overline{\theta})|^2 \geq \eta_i, \overline{\theta} \in \bigcup_{j=1, j \neq i}^{M} \Omega_{AN,j} \end{cases},$$

where M is a quantity of artificial noise signals.

$$\begin{cases} \min_{\omega_{0,i}, m} m \\ \dfrac{|\omega_1^H a(\theta)|^2}{|\omega_{0,i}^H a(\theta)|^2} \leq m, \theta \in \Omega_{AN,j} \\ \omega_{0,i}^H a(\theta_i) = 0 \\ \omega_{0,i}^H \omega_{0,i} \leq \dfrac{P_t - \omega_1^H \omega_1}{M} \\ |\omega_{0,i}^H a(\overline{\theta})|^2 \geq \eta_i, \overline{\theta} \in \bigcup_{j=1, j \neq i}^{M} \Omega_{AN,j} \end{cases}$$

is obtained by introducing a slack variable m.

Therefore, the second signal beamformer parameter of the $i^{th}$ artificial noise signal is obtained by means of calculation.

Step 105: The base station processes a to-be-transmitted signal by using the first signal beamformer parameter and the second signal beamformer parameter, and transmits the processed signal.

In step 105, the base station processes the to-be-transmitted signal by using the first signal beamformer parameter and the second signal beamformer parameter, to obtain the processed signal:

$$y = \omega_1^H x + \omega_0^H n_a; \text{ where}$$

y is the processed signal, $n_a$ is the artificial noise signal, $\omega_1$ is the first signal beamformer parameter, $\omega_1^H$ is the conjugate transpose of $\omega_1$, $\omega_0$ is the second signal beamformer parameter, and $\omega_0^H$ is the conjugate transpose of $\omega_0$.

In this way, a signal received by the authorized user equipment is: $y_B = \alpha \omega_1^H a(\theta_1) x + \alpha \omega_0^H a(\theta_1) n_a + n_B$; and a signal received by the unauthorized user equipment is: $y_{\tilde{B}} = \beta \omega_1^H a(\theta) x + \beta \omega_0^H a(\theta) n_a + n_{\tilde{B}}$, where $y_B$ is the signal received by the authorized user equipment, $y_{\tilde{B}}$ is the signal received by an unauthorized user equipment, $\alpha$ is a first channel fading parameter of a channel corresponding to the signal received by the authorized user equipment, $\beta$ is a second channel fading parameter of a channel corresponding to the signal received by the unauthorized user equipment, $n_a$ is the artificial noise signal, $n_B$ is a noise signal generated by the authorized user equipment, $n_B$ is a noise signal generated by the unauthorized user equipment, $\omega_1$ is the first signal beamformer parameter, $\omega_1^H$ is the conjugate transpose of $\omega_1$, $\omega_0$ is the second signal beamformer parameter, $\omega_0^H$ is the conjugate transpose of $\omega_0$, $a(\theta)$ is the direction vector function, $\theta$ is the direction angle whose value range is the energy leakage area, $a(\theta_1)$ is the direction vector parameter, and $\theta_1$ is the direction angle for receiving the secrecy signal by the authorized user equipment.

In the solution of this embodiment of the present disclosure, a base station receives an uplink pilot signal sent by authorized user equipment, and determines a direction vector parameter and a first channel fading parameter of a channel according to the uplink pilot signal, where the direction vector parameter is used for receiving a secrecy signal by the authorized user equipment, and the channel is used for transmitting the secrecy signal; calculates, according to the direction vector parameter and the first channel fading parameter, a first signal beamformer parameter used for transmitting the secrecy signal, determines a transmission area of an artificial noise signal according to the direction vector parameter, and calculates, according to the direction vector parameter, a second signal beamformer parameter used for transmitting the artificial noise signal; and processes a to-be-transmitted signal by using the first signal beamformer parameter and the second signal beamformer parameter, and transmits the processed signal. In this way, in a non-target direction, energy leakage of the secrecy signal transmitted by the base station to the authorized user equipment is relatively small, and the base station transmits an artificial noise signal to unauthorized user equipment in a determined transmission area of the artificial noise signal. Therefore, artificial noise signals are concentrated in an area with a relatively high secrecy signal leakage risk, to reduce interference caused to signal receiving of authorized user equipment in another direction.

Figure 2:
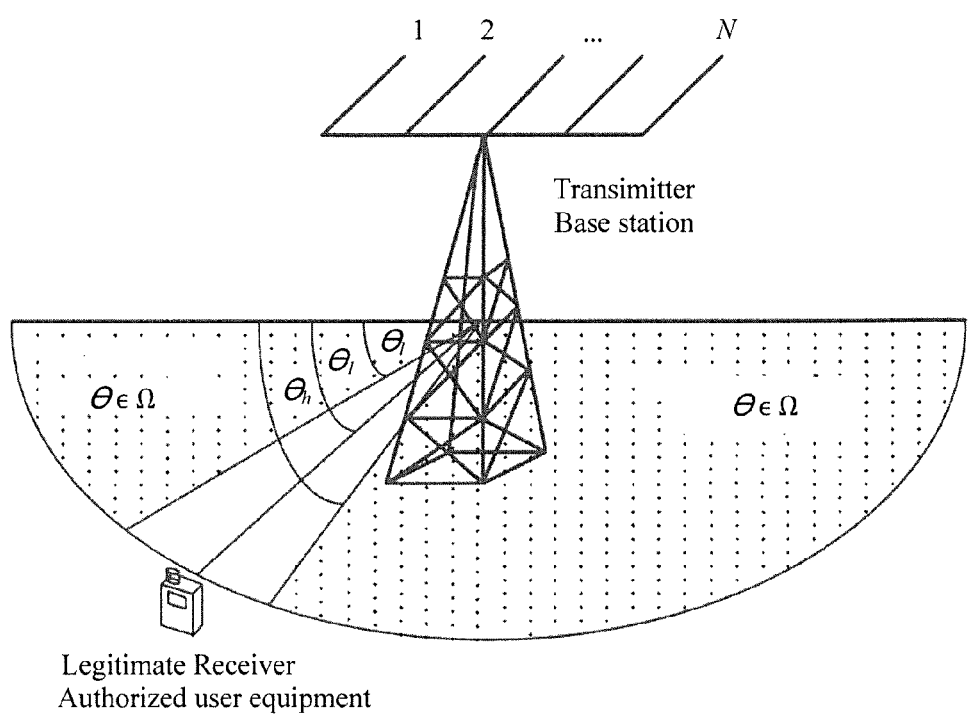
FIG. 2 is a schematic diagram of an application scenario of an embodiment of the present disclosure.

Based on the content recorded in the foregoing embodiment, an embodiment of the present disclosure provides a schematic flowchart of a signal sending method. An application scenario of this embodiment of the present disclosure is shown in FIG. 2: A base station is configured with N antennas, and within a signal coverage area of the base station, a direction angle of authorized user equipment is $\theta_1$, where $\theta_1 \in [\theta_l, \theta_h]$. A possible direction angle of unauthorized user equipment corresponding to the authorized user equipment is $\theta \in \Omega = [-\pi/2, \theta_l] \cup [\theta_h, \pi/2]$.

According to the method recorded in the foregoing embodiment, a beamformer of a secrecy signal transmitted to the authorized user equipment reduces energy leakage of the secrecy signal in a non-target direction as much as possible, and transmission areas of a beamformer of a transmitted artificial noise signal used to interfere with secrecy signal receiving of the unauthorized user equipment are concentrated in a direction with a relatively high secrecy signal leakage risk as much as possible, to reduce signal interference caused to authorized user equipment in another direction.

Figure 3A:
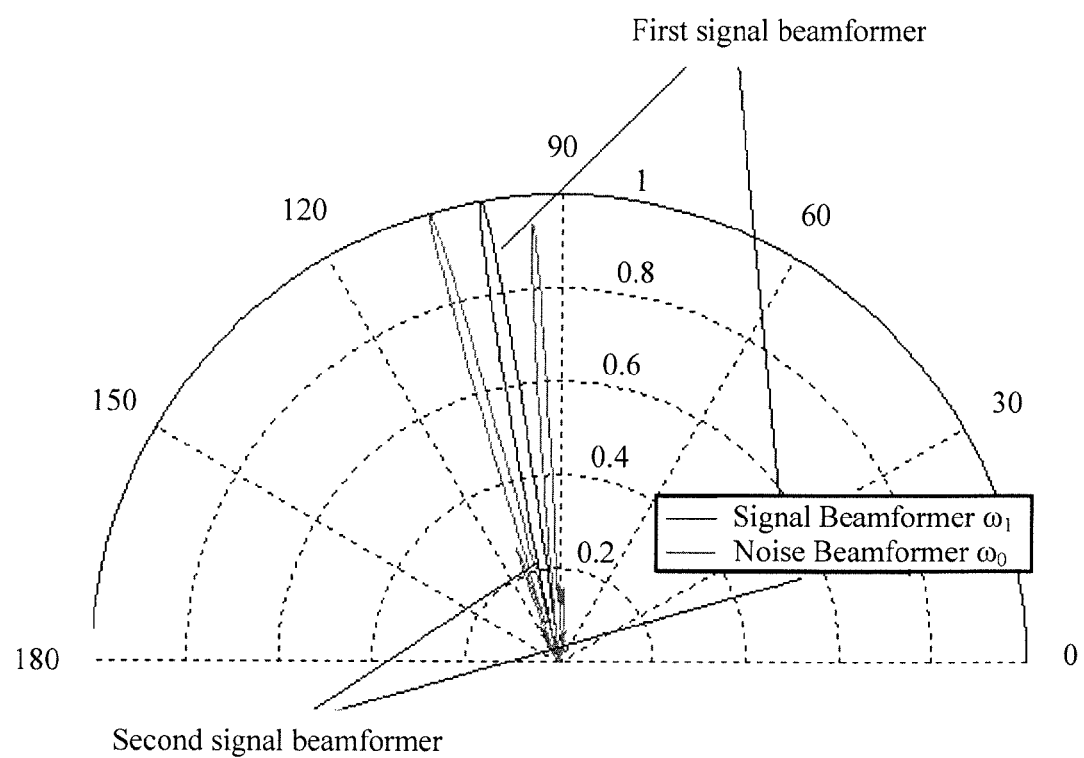
FIG. 3(a) and FIG. 3(b) are beam diagrams of a secrecy signal and an artificial noise signal.
Figure 3B:
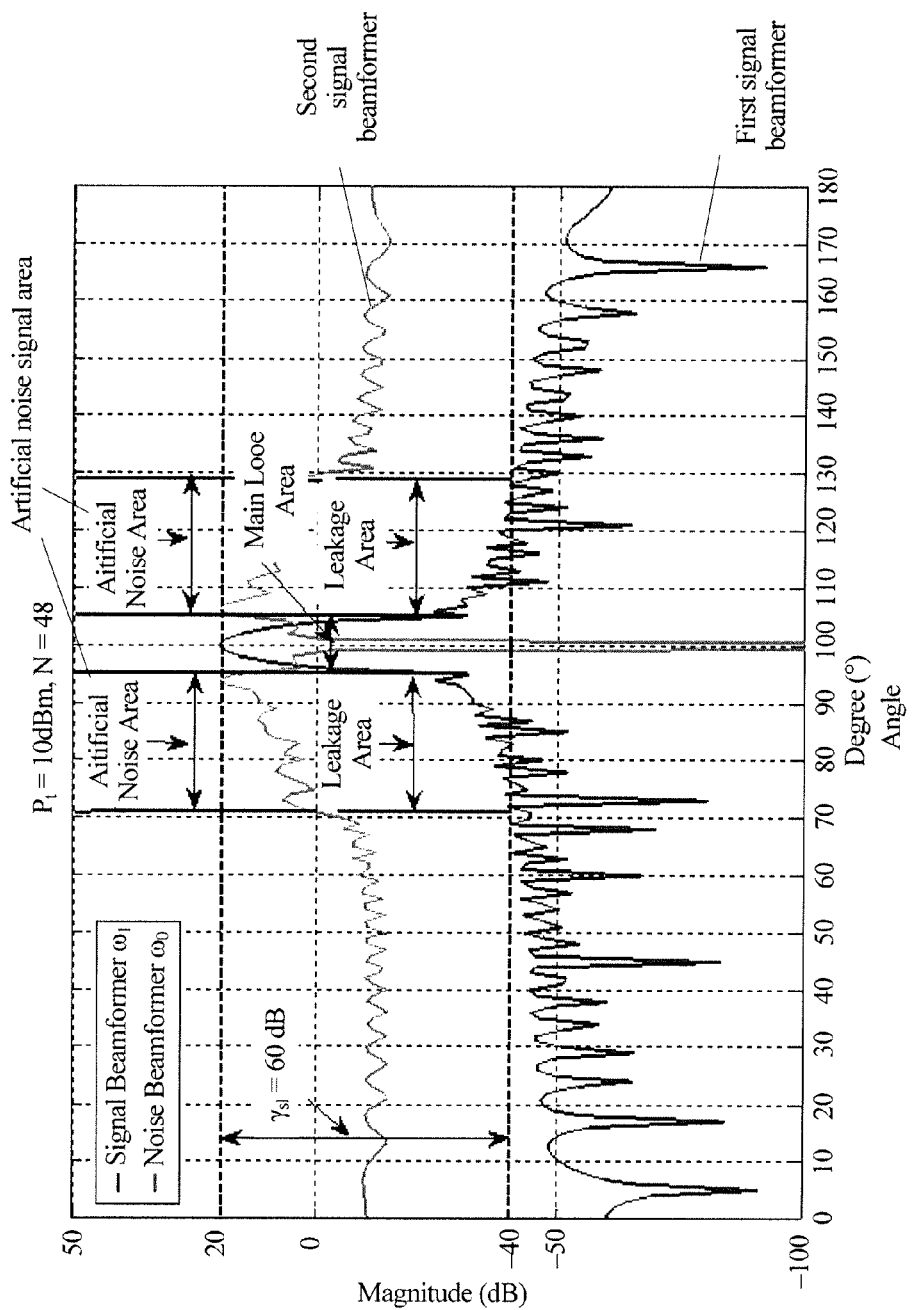

Simulation is performed by using the method recorded in the foregoing embodiment, and the following simulation results are obtained:

FIG. 3(a) and FIG. 3(b) are beam diagrams of a secrecy signal and an artificial noise signal.

A main lobe is of 10°, and a target angle is 100°.

FIG. 3(a) is a beam diagram represented by using polar coordinates, and FIG. 3(b) is a beam diagram represented by using rectangular coordinates.

Figure 4:
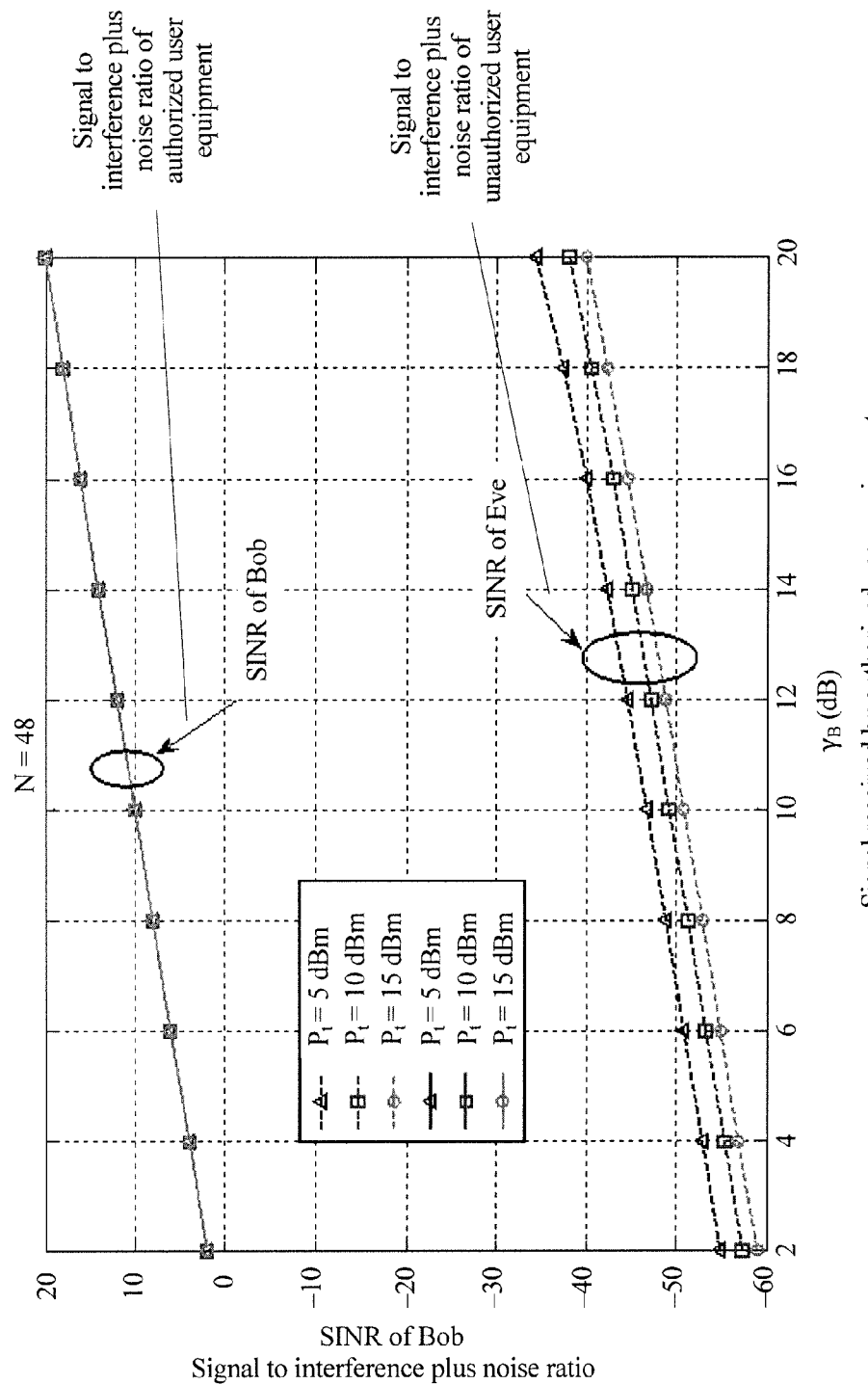
FIG. 4 is a diagram of signal to interference plus noise ratio changes of a signal received by authorized user equipment and a signal received by unauthorized user equipment.

FIG. 4 is a diagram of signal to interference plus noise ratio changes of a signal received by authorized user equipment and a signal received by unauthorized user equipment.

Figure 5:
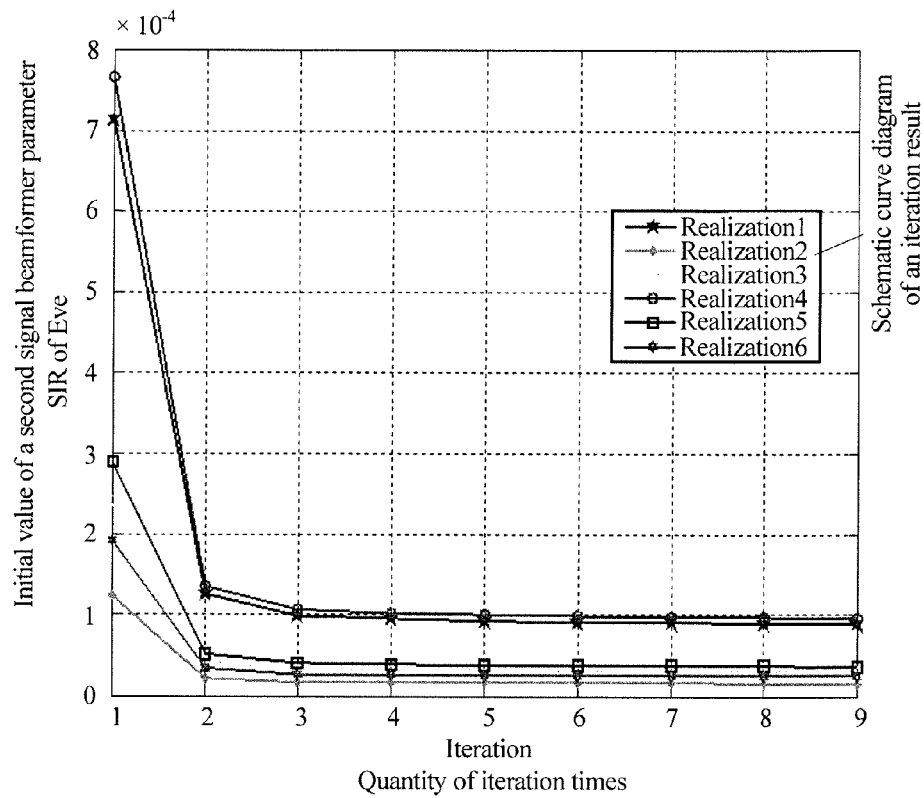
FIG. 5 is a schematic diagram of an algorithm convergence speed according to an embodiment of the present disclosure.

FIG. 5 is a schematic diagram of an algorithm convergence speed according to an embodiment of the present disclosure.

That is, in a non-target direction, energy leakage of a secrecy signal sent by a base station to authorized user equipment is minimum, and an artificial noise signal is transmitted to unauthorized user equipment in a determined transmission area of an artificial noise signal, so that artificial noise signals are concentrated in an area with a relatively high secrecy signal leakage risk, to reduce interference caused to signal receiving of authorized user equipment in another direction.

Figure 6:
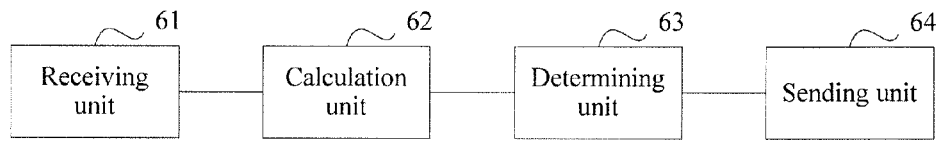
FIG. 6 is a schematic structural diagram of a signal sending device according to an embodiment of the present disclosure.

FIG. 6 is a schematic structural diagram of a signal sending device according to an embodiment of the present disclosure. The signal sending device includes a receiving unit 61, a calculation unit 62, a determining unit 63, and a sending unit 64.

The receiving unit 61 is configured to: receive an uplink pilot signal sent by authorized user equipment, and determine a direction vector parameter and a first channel fading parameter according to the uplink pilot signal, where the direction vector parameter is used for receiving a secrecy signal by the authorized user equipment, and the channel is used for transmitting the secrecy signal.

The calculation unit 62 is configured to calculate, according to the direction vector parameter and the first channel fading parameter, a first signal beamformer parameter used for transmitting the secrecy signal, where the first signal beamformer parameter can enable energy leakage of the secrecy signal transmitted by the base station to be less than a first threshold, and enable a signal to interference plus noise ratio of the secrecy signal received by the authorized user equipment to be greater than a second threshold.

The determining unit 63 is configured to determine a transmission area of an artificial noise signal according to the direction vector parameter.

The calculation unit 62 is configured to calculate, according to the direction vector parameter, a second signal beamformer parameter used for transmitting the artificial noise signal, where the second signal beamformer parameter can enable interference caused to the authorized user equipment by the artificial noise signal transmitted by the base station to be less than a preset threshold, enable a signal to interference plus noise ratio of the artificial noise signal received by unauthorized user equipment in the transmission area to be less than a third threshold, and enable a sum of transmit power of the artificial noise signal and transmit power of the secrecy signal to be less than preset transmit power.

The sending unit 64 is configured to: process a to-be-transmitted signal by using the first signal beamformer parameter and the second signal beamformer parameter, and transmit the processed signal.

Optionally, the calculation unit 62 is specifically configured to: when the energy leakage of the secrecy signal transmitted by using the first signal beamformer parameter is less than the first threshold, obtain the following formula according to the direction vector parameter and the first channel fading parameter:

$$\int_\Omega |\omega_1^H a(\theta)|^2 d\theta \leq \omega_1^H P \omega_1;$$

when the secrecy signal transmitted by using the first signal beamformer parameter enables the signal to interference plus noise ratio of the secrecy signal received by the authorized user equipment to be greater than the specified second threshold, obtain the following formula according to the direction vector parameter and the first channel fading parameter:

$$|\alpha|^2|\omega_1^H a(\theta_1)|^2 \geq \gamma_B; \text{ and}$$

obtain, according to $\int_\Omega |\omega_1^H a(\theta)|^2 d\theta \leq \omega_1^H P\omega_1$ and $|\alpha|^2|\omega_1^H a(\theta_1)|^2 \geq \gamma_B$, the first signal beamformer parameter used for transmitting the secrecy signal:

$$\omega_1 = \sqrt{\frac{\gamma_B}{|\alpha|^2}} \frac{P^{-1}a(\theta_1)}{a^H(\theta_1)P^{-1}a(\theta_1)};$$

where $\omega_1$ is the first signal beamformer parameter, $\omega_1^H$ is conjugate transpose of $\omega_1$, $a(\theta)$ is a direction vector function, $\theta$ is a direction angle whose value range is $\Omega$, $\Omega$ is a side lobe area of a secrecy signal beam, $a(\theta_1)$ is the direction vector parameter for receiving the secrecy signal by the authorized user equipment, $\theta_1$ is a direction angle for receiving the secrecy signal by the authorized user equipment, $\gamma_B$ is the second threshold, $\alpha$ is the first channel fading parameter of the channel used for transmitting the secrecy signal, $P=\int_\Omega a(\theta)a^H(\theta)d\theta$, and $\omega_1^H P\omega_1$ is the first threshold.

Optionally, the calculation unit 62 is specifically configured to: when the interference caused to the authorized user equipment by the artificial noise signal transmitted by using the second signal beamformer parameter is less than the preset threshold, obtain the following formula according to the direction vector parameter:

$$\omega_0^H a(\theta_1) \leq \eta;$$

when the signal to interference plus noise ratio of the artificial noise signal received by the unauthorized user equipment in the transmission area is less than the third threshold, obtain the following formula according to the direction vector parameter:

$$\frac{|\omega_1^H a(\theta)|^2}{|\omega_0^H a(\theta)|^2} \leq \lambda;$$

when the sum of the transmit power of the artificial noise signal and the transmit power of the secrecy signal is less than the preset transmit power, obtain the following formula:

$$\omega_0^H \omega_0 \leq P_t - \omega_1^H \omega_1; \text{ and}$$

obtain, according to $$\omega_0^H a(\theta_1) \leq \eta, \; \frac{|\omega_1^H a(\theta)|^2}{|\omega_0^H a(\theta)|^2} \leq \lambda, \text{ and } \omega_0^H \omega_0 \leq P_t - \omega_1^H \omega_1,$$

the second signal beamformer parameter used for transmitting the artificial noise signal; where $\omega_0$ is the second signal beamformer parameter, $\omega_0^H$ is conjugate transpose of $\omega_0$, $a(\theta)$ is a direction vector function, $\theta$ is a direction angle whose value range is $\Omega_{AN}$, $\Omega_{AN}$ is the determined transmission area of the artificial noise signal, $a(\theta_1)$ is the direction vector parameter, $\lambda$ is the third threshold, $\eta$ is the preset threshold, $\omega_0^H \omega_0$ is the transmit power of the artificial noise signal, $\omega_1$ is the first signal beamformer parameter, $\omega_1^H$ is conjugate transpose of $\omega_1$, $\omega_1^H \omega_1$ is the transmit power of the secrecy signal, $P_t$ is the preset transmit power, and $\theta_1$ is a direction angle for receiving the secrecy signal by the authorized user equipment.

Optionally, the determining unit 63 is specifically configured to determine an energy leakage area of the secrecy signal according to the direction vector parameter in the following manner:

$$\frac{|\omega_1^H a(\theta_1)|^2}{|\omega_1^H a(\theta)|^2} \leq \gamma_{sl};$$

where $\omega_1$ is the first signal beamformer parameter, $\omega_1^H$ is the conjugate transpose of $\omega_1$, $a(\theta)$ is the direction vector function, $\theta$ is a direction angle whose value range is the energy leakage area, $a(\theta_1)$ is the direction vector parameter, $\theta_1$ is the direction angle for receiving the secrecy signal by the authorized user equipment, and $\gamma_{sl}$ is a specified value; and obtain the transmission area of the artificial noise signal according to the energy leakage area of the secrecy signal and a main lobe area of a signal beamformer used for transmitting the secrecy signal.

Optionally, the determining unit 63 is specifically configured to: when there are at least two to-be-sent artificial noise signals, determine transmission areas of the at least two to-be-sent artificial noise signals according to the direction vector parameter;

divide the determined transmission areas according to a quantity of to-be-sent artificial noise signals; and determine a transmission area for each to-be-sent artificial noise signal according to a division result, where transmission areas corresponding to all artificial noise signals do not overlap.

Optionally, the sending unit 64 is specifically configured to process the to-be-transmitted signal by using the first signal beamformer parameter and the second signal beamformer parameter, to obtain the processed signal:

$$y = \omega_1^H x + \omega_0^H n_a; \text{ where}$$

y is the processed signal, $n_a$ is the artificial noise signal, $\omega_1$ is the first signal beamformer parameter, $\omega_1^H$ is the conjugate transpose of $\omega_1$, $\omega_0$ is the second signal beamformer parameter, and $\omega_0^H$ is the conjugate transpose of $\omega_0$.

It should be noted that the signal sending device in this embodiment of the present disclosure may be implemented in a software manner, or may be implemented in a hardware manner. This is not limited herein.

Figure 7:
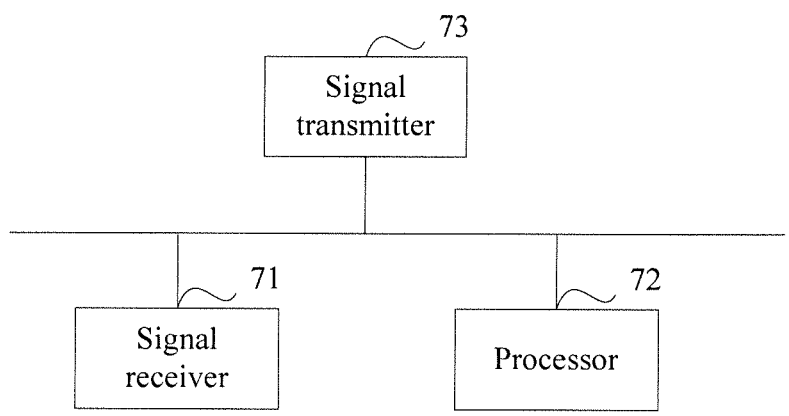
FIG. 7 is a schematic structural diagram of a signal sending device according to an embodiment of the present disclosure.

FIG. 7 is a schematic structural diagram of a signal sending device according to an embodiment of the present disclosure. A general computer structure may be used for the signal sending device. The signal sending device includes a signal receiver 71, a processor 72, and a signal transmitter 73.

The signal receiver 71 is configured to: receive an uplink pilot signal sent by authorized user equipment, and determine a direction vector parameter and a first channel fading parameter according to the uplink pilot signal, where the direction vector parameter is used for receiving a secrecy signal by the authorized user equipment, and the channel is used for transmitting the secrecy signal.

The processor 72 is configured to calculate, according to the direction vector parameter and the first channel fading parameter, a first signal beamformer parameter used for transmitting the secrecy signal, where the first signal beamformer parameter can enable energy leakage of the secrecy signal transmitted by the base station to be less than a first threshold, and enable a signal to interference plus noise ratio of the secrecy signal received by the authorized user equipment to be greater than a second threshold; and determine a transmission area of an artificial noise signal according to the direction vector parameter, and calculate, according to the direction vector parameter, a second signal beamformer parameter used for transmitting the artificial noise signal, where the second signal beamformer parameter can enable interference caused to the authorized user equipment by the artificial noise signal transmitted by the base station to be less than a preset threshold, enable a signal to interference plus noise ratio of the artificial noise signal received by unauthorized user equipment in the transmission area to be less than a third threshold, and enable a sum of transmit power of the artificial noise signal and transmit power of the secrecy signal to be less than preset transmit power.

The signal transmitter 73 is configured to: process a to-be-transmitted signal by using the first signal beamformer parameter and the second signal beamformer parameter, and transmit the processed signal.

Specifically, that the processor 72 calculates, according to the direction vector parameter and the first channel fading parameter, a first signal beamformer parameter used for transmitting the secrecy signal specifically includes:

when the energy leakage of the secrecy signal transmitted by using the first signal beamformer parameter is less than the first threshold, the following formula is obtained according to the direction vector parameter and the first channel fading parameter:

$$\int_\Omega |\omega_1^H a(\theta)|^2 d\theta \leq \omega_1^H P \omega_1;$$

when the secrecy signal transmitted by using the first signal beamformer parameter enables the signal to interference plus noise ratio of the secrecy signal received by the authorized user equipment to be greater than the specified second threshold, the following formula is obtained according to the direction vector parameter and the first channel fading parameter:

$$|\alpha|^2 |\omega_1^H a(\theta_1)|^2 \geq \gamma_B; \text{ and}$$

the first signal beamformer parameter used for transmitting the secrecy signal is obtained according to $$\int_\Omega |\omega_1^H a(\theta)|^2 d\theta \leq \omega_1^H P \omega_1 \text{ and } |\alpha|^2 |\omega_1^H a(\theta_1)|^2 \geq \gamma_B;$$

$$\omega_1 = \sqrt{\frac{\gamma_B}{|\alpha|^2}} \frac{P^{-1} a(\theta_1)}{a^H(\theta_1) P^{-1} a(\theta_1)};$$

where $\omega_1$ is the first signal beamformer parameter, $\omega_1^H$ is conjugate transpose of $\omega_1$, $a(\theta)$ is a direction vector function, $\theta$ is a direction angle whose value range is $\Omega$, $\Omega$ is a side lobe area of a secrecy signal beam, $a(\theta_1)$ is the direction vector parameter for receiving the secrecy signal by the authorized user equipment, $\theta_1$ is a direction angle for receiving the secrecy signal by the authorized user equipment, $\gamma_B$ is the second threshold, $\alpha$ is the first channel fading parameter of the channel used for transmitting the secrecy signal, $P = \int_\Omega a(\theta) a^H(\theta) d\theta$, and $\omega_1^H P \omega_1$ is the first threshold.

Specifically, that the processor 72 calculates, according to the direction vector parameter, a second signal beamformer parameter used for transmitting the artificial noise signal specifically includes:

when the interference caused to the authorized user equipment by the artificial noise signal transmitted by using the second signal beamformer parameter is less than the preset threshold, the following formula is obtained according to the direction vector parameter:

$$\omega_0^H a(\theta_1) \leq \eta;$$

when the signal to interference plus noise ratio of the artificial noise signal received by the unauthorized user equipment in the transmission area is less than the third threshold, the following formula is obtained according to the direction vector parameter:

$$\frac{|\omega_1^H a(\theta)|^2}{|\omega_0^H a(\theta)|^2} \leq \lambda;$$

when the sum of the transmit power of the artificial noise signal and the transmit power of the secrecy signal is less than the preset transmit power, the following formula is obtained:

$$\omega_0^H \omega_0 \leq P_t - \omega_1^H \omega_1; \text{ and}$$

the second signal beamformer parameter used for transmitting the artificial noise signal is obtained according to $$\omega_0^H a(\theta_1) \leq \eta, \frac{|\omega_1^H a(\theta)|^2}{|\omega_0^H a(\theta)|^2} \leq \lambda, \text{ and } \omega_0^H \omega_0 \leq P_t - \omega_1^H \omega_1,$$

where $\omega_0$ is the second signal beamformer parameter, $\omega_0^H$ is conjugate transpose of $\omega_0$, $a(\theta)$ is a direction vector function, $\theta$ is a direction angle whose value range is $\Omega_{AN}$, $\Omega_{AN}$ is the determined transmission area of the artificial noise signal, $a(\theta_1)$ is the direction vector parameter, $\lambda$ is the third threshold, $\eta$ is the preset threshold, $\omega_0^H f_0$ is the transmit power of the artificial noise signal, $\omega_1$ is the first signal beamformer parameter, $\omega_1^H$ is conjugate transpose of $\omega_1$, $\omega_1^H \omega_1$ is the transmit power of the secrecy signal, $P_t$ is the preset transmit power, and $\theta_1$ is a direction angle for receiving the secrecy signal by the authorized user equipment.

Specifically, that the processor 72 determines a transmission area of an artificial noise signal according to the direction vector parameter specifically includes:

an energy leakage area of the secrecy signal is determined according to the direction vector parameter in the following manner:

$$\frac{|\omega_1^H a(\theta_1)|^2}{|\omega_1^H a(\theta)|^2} \leq \gamma_{sl};$$

where $\omega_1$ is the first signal beamformer parameter, $\omega_1^H$ is the conjugate transpose of $w_1$, $a(\theta)$ is the direction vector function, $\theta$ is a direction angle whose value range is the energy leakage area, $a(\theta_1)$ is the direction vector parameter, $\theta_1$ is the direction angle for receiving the secrecy signal by the authorized user equipment, and $\gamma_{sl}$ is a specified value; and the transmission area of the artificial noise signal is obtained according to the energy leakage area of the secrecy signal and a main lobe area of a signal beamformer used for transmitting the secrecy signal.

Specifically, that the processor 72 determines a transmission area of an artificial noise signal according to the direction vector parameter includes:

when there are at least two to-be-sent artificial noise signals, transmission areas of the at least two to-be-sent artificial noise signals are determined according to the direction vector parameter;

the determined transmission areas are divided according to a quantity of to-be-sent artificial noise signals; and a transmission area is determined for each to-be-sent artificial noise signal according to a division result, where transmission areas corresponding to all artificial noise signals do not overlap.

Specifically, that the signal transmitter 73 processes a to-be-transmitted signal by using the first signal beamformer parameter and the second signal beamformer parameter includes:

the to-be-transmitted signal is processed by using the first signal beamformer parameter and the second signal beamformer parameter, to obtain the processed signal:

$$y = \omega_1^H x + \omega_0^H n_a; \text{ where}$$

y is the processed signal, $n_a$ is the artificial noise signal, $\omega_1$ is the first signal beamformer parameter, $\omega_1^H$ is the conjugate transpose of $\omega_1$, $\omega_0$ is the second signal beamformer parameter, and $\omega_0^H$ is the conjugate transpose of $\omega_0$.

Persons skilled in the art should understand that the embodiments of the present disclosure may be provided as a method, an apparatus (device), or a computer program product. Therefore, the present disclosure may use a form of hardware only embodiments, software only embodiments, or embodiments with a combination of software and hardware. Moreover, the present disclosure may use a form of a computer program product that is implemented on one or more computer-usable storage media (including but not limited to a disk memory, a CD-ROM, an optical memory, and the like) that include computer-usable program code.

The present disclosure is described with reference to the flowcharts and/or block diagrams of the method, the apparatus (device), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some embodiments of the present disclosure have been described, persons skilled in the art can make changes and modifications to these embodiments once they learn the basic inventive concept. Therefore, the following claims are intended to be construed as to cover the preferred embodiments and all changes and modifications falling within the scope of the present disclosure.

Obviously, persons skilled in the art can make various modifications and variations to the present disclosure without departing from the spirit and scope of the present disclosure. The present disclosure is intended to cover these modifications and variations provided that they fall within the scope of protection defined by the following claims and their equivalent technologies.

What is claimed is:

1. A signal sending method, comprising:
   receiving, by a base station, an uplink pilot signal sent by authorized user equipment, and determining a direction vector parameter and a first channel fading parameter of a channel according to the uplink pilot signal, wherein the direction vector parameter is used for receiving a secrecy signal by the authorized user equipment, and the channel is used for transmitting the secrecy signal;
   calculating, by the base station according to the direction vector parameter and the first channel fading parameter, a first signal beamformer parameter used for transmitting the secrecy signal, wherein the first signal beamformer parameter can enable energy leakage of the secrecy signal transmitted by the base station to be less than a first threshold, and enable a signal to interference plus noise ratio of the secrecy signal received by the authorized user equipment to be greater than a second threshold;
   determining, by the base station, a transmission area of an artificial noise signal according to the direction vector parameter, and calculating, according to the direction vector parameter, a second signal beamformer parameter used for transmitting the artificial noise signal, wherein the second signal beamformer parameter can enable interference caused to the authorized user equipment by the artificial noise signal transmitted by the base station to be less than a preset threshold, enable a signal to interference plus noise ratio of the artificial noise signal received by unauthorized user equipment in the transmission area to be less than a third threshold, and enable a sum of transmit power of the artificial noise signal and transmit power of the secrecy signal to be less than preset transmit power; and
   processing, by the base station, a to-be-transmitted signal by using the first signal beamformer parameter and the second signal beamformer parameter, and transmitting the processed signal.

2. The signal sending method according to claim 1, wherein the calculating, by the base station according to the direction vector parameter and the first channel fading parameter, a first signal beamformer parameter used for transmitting the secrecy signal comprises:
when the energy leakage of the secrecy signal transmitted by using the first signal beamformer parameter is less than the first threshold, obtaining, by the base station, the following formula according to the direction vector parameter and the first channel fading parameter:

$\int_{1 o 6} |\omega_1^H a(\theta)|^2 d\theta \leq \omega_1^H P \omega_1$;

when the secrecy signal transmitted by using the first signal beamformer parameter enables the signal to interference plus noise ratio of the secrecy signal received by the authorized user equipment to be greater than the specified second threshold, obtaining, by the base station, the following formula according to the direction vector parameter and the first channel fading parameter:

$|\alpha|^2 |\omega_1^H a(\theta_1)|^2 \geq \gamma_B$; and obtaining, by the base station according to $\int_\Omega |\omega_1^H a(\theta)|^2 d\theta \leq \omega_1^H P \omega_1$ and $|\alpha|^2 |\omega_1^H a(\theta_1)|^2 \geq \gamma_B$, the first signal beamformer parameter used for transmitting the secrecy signal:

$$\omega_1 = \sqrt{\frac{\gamma_B}{|\alpha|^2}} \frac{P^{-1} a(\theta_1)}{a^H(\theta_1) P^{-1} a(\theta_1)};$$

wherein
$\omega_1$ is the first signal beamformer parameter, $\omega_1^H$ is conjugate transpose of $\omega_1$, $a(\theta)$ is a direction vector function, $\theta$ is a direction angle whose value range is $\Omega$, $\Omega$ is a side lobe area of a secrecy signal beam, $a(\theta_1)$ is the direction vector parameter for receiving the secrecy signal by the authorized user equipment, $\theta_1$ is a direction angle for receiving the secrecy signal by the authorized user equipment, $\gamma_B$ is the second threshold, $\alpha$ is the first channel fading parameter of the channel used for transmitting the secrecy signal, $P = \int_\Omega a(\theta) a^H(\theta) d\theta$, and $\omega_1^H P \omega_1$ is the first threshold.

3. The signal sending method according to claim 1, wherein the calculating, by the base station according to the direction vector parameter, a second signal beamformer parameter used for transmitting the artificial noise signal comprises:
when the interference caused to the authorized user equipment by the artificial noise signal transmitted by using the second signal beamformer parameter is less than the preset threshold, obtaining, by the base station, the following formula according to the direction vector parameter:

$\omega_0^H a(\theta_1) \leq \eta$.

when the signal to interference plus noise ratio of the artificial noise signal received by the unauthorized user equipment in the transmission area is less than the third threshold, obtaining, by the base station, the following formula according to the direction vector parameter:

$\frac{|\omega_1^H a(\theta)|^2}{|\omega_0^H a(\theta)|^2} \leq \lambda$;

when the sum of the transmit power of the artificial noise signal and the transmit power of the secrecy signal is less than the preset transmit power, obtaining, by the base station, the following formula:

$\omega_0^H \omega_0 \leq P_t - \omega_1^H \omega_1$; and obtaining, by the base station according to $\omega_0^H a(\theta_1) \leq \eta$, $\frac{|\omega_1^H a(\theta)|^2}{|\omega_0^H a(\theta)|^2} \leq \lambda$, and $\omega_0^H \omega_0 \leq P_t - \omega_1^H \omega_1$, the second signal beamformer parameter used for transmitting the artificial noise signal; wherein
$\omega_0$ is the second signal beamformer parameter, $\omega_0^H$ is conjugate transpose of $\omega_0$, $a(\theta)$ is a direction vector function, $\theta$ is a direction angle whose value range is $\Omega_{An}$, $\Omega_{AN}$ is the determined transmission area of the artificial noise signal, $a(\theta_1)$ is the direction vector parameter, $\lambda$ is the third threshold, $\eta$ is the preset threshold, $\omega_0^H \omega_0$ is the transmit power of the artificial noise signal, $\omega_1$ is the first signal beamformer parameter, $\omega_1^H$ is conjugate transpose of $\omega_1$, $\omega_1^H \omega_1$ is the transmit power of the secrecy signal, $P_t$ is the preset transmit power, and $\theta_1$ is a direction angle for receiving the secrecy signal by the authorized user equipment.

4. The signal sending method according to claim 1 wherein the determining, by the base station, a transmission area of an artificial noise signal according to the direction vector parameter comprises:
determining, by the base station, an energy leakage area of the secrecy signal according to the direction vector parameter in the following manner:

$\frac{|\omega_1^H a(\theta_1)|^2}{|\omega_1^H a(\theta)|^2} \leq \gamma_{sl}$;

wherein
$\omega_1$ is the first signal beamformer parameter, $\omega_1^H$ is the conjugate transpose of $\omega_1$, $a(\theta)$ is the direction vector function, $\theta$ is a direction angle whose value range is the energy leakage area, $a(\theta_1)$ is the direction vector parameter, $\theta_1$ is the direction angle for receiving the secrecy signal by the authorized user equipment, and $\gamma_{sl}$ is a specified value; and
obtaining the transmission area of the artificial noise signal according to the energy leakage area of the secrecy signal and a main lobe area of a signal beamformer used for transmitting the secrecy signal.

5. The signal sending method according to claim 1, wherein the determining, by the base station, a transmission area of an artificial noise signal according to the direction vector parameter comprises:
when there are at least two to-be-sent artificial noise signals, determining, by the base station, transmission areas of the at least two to-be-sent artificial noise signals according to the direction vector parameter;
dividing, by the base station, the determined transmission areas according to a quantity of to-be-sent artificial noise signals; and
determining, by the base station, a transmission area for each to-be-sent artificial noise signal according to a division result, wherein transmission areas corresponding to all artificial noise signals do not overlap.

6. The signal sending method according to claim 1, wherein the processing, by the base station, a to-be-transmitted signal by using the first signal beamformer parameter and the second signal beamformer parameter comprises:
processing, by the base station, the to-be-transmitted signal by using the first signal beamformer parameter and the second signal beamformer parameter, to obtain the processed signal:

$y = \omega_1^H x + \omega_0^H n_a$; wherein y is the processed signal, $n_a$ is the artificial noise signal, $\omega_1$ is the first signal beamformer parameter, and $\omega_1^H$ is the conjugate transpose of $\omega_1$, $\omega_0$ is the second signal beamformer parameter, and $\omega_0^H$ si the conjugate transpose of $\omega_0$.

7. A signal sending device, comprising:
a receiving unit, configured to: receive an uplink pilot signal sent by authorized user equipment, and determine a direction vector parameter and a first channel fading parameter of a channel according to the uplink pilot signal, wherein the direction vector parameter is used for receiving a secrecy signal by the authorized user equipment, and the channel is used for transmitting the secrecy signal;
a calculation unit, configured to calculate, according to the direction vector parameter and the first channel fading parameter, a first signal beamformer parameter used for transmitting the secrecy signal, wherein the first signal beamformer parameter can enable energy leakage of the secrecy signal transmitted by a base station to be less than a first threshold, and enable a signal to interference plus noise ratio of the secrecy signal received by the authorized user equipment to be greater than a second threshold;
a determining unit, configured to determine a transmission area of an artificial noise signal according to the direction vector parameter; wherein
the calculation unit is configured to calculate, according to the direction vector parameter, a second signal beamformer parameter used for transmitting the artificial noise signal, wherein the second signal beamformer parameter can enable interference caused to the authorized user equipment by the artificial noise signal transmitted by the base station to be less than a preset threshold, enable a signal to interference plus noise ratio of the artificial noise signal received by unauthorized user equipment in the transmission area to be less than a third threshold, and enable a sum of transmit power of the artificial noise signal and transmit power of the secrecy signal to be less than preset transmit power; and
a sending unit, configured to: process a to-be-transmitted signal by using the first signal beamformer parameter and the second signal beamformer parameter, and transmit the processed signal.

8. The signal sending device according to claim 7, wherein:
the calculation unit is configured to: when the energy leakage of the secrecy signal transmitted by using the first signal beamformer parameter is less than the first threshold, obtain the following formula according to the direction vector parameter and the first channel fading parameter:

$\int_\Omega |\omega_1^H a(\theta)|^2 d\theta \leq \omega_1^H P \omega_1$;

when the secrecy signal transmitted by using the first signal beamformer parameter enables the signal to interference plus noise ratio of the secrecy signal received by the authorized user equipment to be greater than the specified second threshold, obtain the following formula according to the direction vector parameter and the first channel fading parameter:

$|\alpha|^2 |\omega_1^H a(\theta_1)|^2 \geq \gamma_B$; and obtain, according to $\int_\Omega |\omega_1^H a(\theta)|^2 d\theta \leq \omega_1^H P \omega_1$ and $|\alpha|^2 |\omega_1^H a(\theta_1)|^2 \geq \gamma_B$, the first signal beamformer parameter used for transmitting the secrecy signal:

$$\omega_1 = \sqrt{\frac{\gamma_B}{|\alpha|^2}} \frac{P^{-1} a(\theta_1)}{a^H(\theta_1) P^{-1} a(\theta_1)};$$

wherein
$\omega_1$ is the first signal beamformer parameter, $\omega_1^H$ is conjugate transpose of $\omega_1$, $a(\theta)$ is a direction vector function, $\theta$ is a direction angle whose value range is $\Omega$, $\Omega$ is a side lobe area of a secrecy signal beam, $a(\theta_1)$ is the direction vector parameter for receiving the secrecy signal by the authorized user equipment, $\theta_1$ is a direction angle for receiving the secrecy signal by the authorized user equipment, $\gamma_B$ is the second threshold, $\alpha$ is the first channel fading parameter of the channel used for transmitting the secrecy signal, $P = \int_\Omega a(\theta) a^H(\theta) d\theta$, and $\omega_1^H P \omega_1$ is the first threshold.

9. The signal sending device according to claim 7, wherein:
the calculation unit is configured to: when the interference caused to the authorized user equipment by the artificial noise signal transmitted by using the second signal beamformer parameter is less than the preset threshold, obtain the following formula according to the direction vector parameter:

$\omega_0^H a(\theta_1) \leq \eta$;

when the signal to interference plus noise ratio of the artificial noise signal received by the unauthorized user equipment in the transmission area is less than the third threshold, obtain the following formula according to the direction vector parameter:

$$\frac{|\omega_1^H a(\theta)|^2}{|\omega_0^H a(\theta)|^2} \leq \lambda;$$

when the sum of the transmit power of the artificial noise signal and the transmit power of the secrecy signal is less than the preset transmit power, obtain the following formula:

$\omega_0^H \omega_0 \leq P_t - \omega_1^H \omega_1$; and obtain, according to $$\omega_0^H a(\theta_1) \leq \eta, \frac{|\omega_1^H a(\theta)|^2}{|\omega_0^H a(\theta)|^2} \leq \lambda, \text{ and } \omega_0^H \omega_0 \leq P_t - \omega_1^H \omega_1,$$

the second signal beamformer parameter used for transmitting the artificial noise signal; wherein
$\omega_0$ is the second signal beamformer parameter, $\omega_0^H$ is conjugate transpose of $\omega_0$, $a(\theta)$ is a direction vector function, $\theta$ is a direction angle whose value range is $\Omega_{AN}$, $\Omega^{AN}$ is the determined transmission area of the artificial noise signal, $a(\theta_1)$ is the direction vector parameter, $\lambda$ is the third threshold, $\eta$ is the preset threshold, $\omega_0^H \omega_0$ is the transmit power of the artificial noise signal, $\omega_1$ is the first signal beamformer parameter, $\omega_1^H$ is conjugate transpose of $\omega_1$, $\omega_1^H \omega_1$ is the transmit power of the secrecy signal, $P_t$ is the preset transmit power, and $\theta_1$ is a direction angle for receiving the secrecy signal by the authorized user equipment.

10. The signal sending device according to claim 7, wherein:
the determining unit is configured to determine an energy leakage area of the secrecy signal according to the direction vector parameter in the following manner:

$$\frac{|\omega_1^H a(\theta_1)|^2}{|\omega_1^H a(\theta)|^2} \leq \gamma_{sl};$$

wherein
$\omega_1$ is the first signal beamformer parameter, $\omega_1^H$ is the conjugate transpose of $\omega_1$, $a(\theta)$ is the direction vector function, $\theta$ is a direction angle whose value range is the energy leakage area, $a(\theta_1)$ is the direction vector parameter, $\theta_1$ is the direction angle for receiving the secrecy signal by the authorized user equipment, and $\gamma_{sl}$ is a specified value; and
obtain the transmission area of the artificial noise signal according to the energy leakage area of the secrecy signal and a main lobe area of a signal beamformer used for transmitting the secrecy signal.

11. The signal sending device according to claim 7, wherein:
the determining unit is configured to: when there are at least two to-be-sent artificial noise signals, determine transmission areas of the at least two to-be-sent artificial noise signals according to the direction vector parameter;
divide the determined transmission areas according to a quantity of to-be-sent artificial noise signals; and
determine a transmission area for each to-be-sent artificial noise signal according to a division result, wherein transmission areas corresponding to all artificial noise signals do not overlap.

12. The signal sending device according to claim 7, wherein:
the sending unit is configured to process the to-be-transmitted signal by using the first signal beamformer parameter and the second signal beamformer parameter, to obtain the processed signal:

$$y = \omega_1^H x + \omega_0^H n_a; \text{ wherein}$$

y is the processed signal, $n_a$ is the artificial noise signal, $\omega_1$ is the first signal beamformer parameter, $\omega_1^H$ is the conjugate transpose of $\omega_1$, $\omega_0$ is the second signal beamformer parameter, and $\omega_0^H$ is the conjugate transpose of $\omega_0$.

* * * * *